United States Patent
Shutic et al.

(10) Patent No.: US 7,074,274 B1
(45) Date of Patent: Jul. 11, 2006

(54) QUICK COLOR CHANGE POWDER COATING SYSTEM

(75) Inventors: Jeffrey R. Shutic, Wakeman, OH (US); Edward L. Jones, Strongsville, OH (US); Michael S. Thomas, Elyria, OH (US); Andrew M. Peddie, North Royalton, OH (US); Kenneth A. Kreeger, Avon Lake, OH (US); Joseph G. Schroeder, North Royalton, OH (US)

(73) Assignee: Nordson Corporation, Westlake, OH (US)

( * ) Notice: Subject to any disclaimer, the term of this patent is extended or adjusted under 35 U.S.C. 154(b) by 0 days.

(21) Appl. No.: 10/130,615

(22) PCT Filed: Sep. 15, 2000

(86) PCT No.: PCT/US00/25383

§ 371 (c)(1),
(2), (4) Date: Feb. 28, 2003

(87) PCT Pub. No.: WO01/19529

PCT Pub. Date: Mar. 22, 2001

Related U.S. Application Data

(60) Provisional application No. 60/154,624, filed on Sep. 17, 1999.

(51) Int. Cl.
*B05B 15/12* (2006.01)
*B05C 19/00* (2006.01)

(52) U.S. Cl. .................. 118/309; 118/326; 454/53; 55/DIG. 46

(58) Field of Classification Search ............... 118/308, 118/309, 326; 454/50, 53; 55/DIG. 46
See application file for complete search history.

(56) References Cited

U.S. PATENT DOCUMENTS 3,714,926 A  2/1973 Ofner (Continued)

FOREIGN PATENT DOCUMENTS

CH  529 590 B  10/1972

(Continued)

OTHER PUBLICATIONS

International Search Report for PCT/US 00/25383.
International Search Report for PCT GB 98 02659.

*Primary Examiner*—Chris Fiorilla
*Assistant Examiner*—Yewebdar Tadesse
(74) *Attorney, Agent, or Firm*—Calfee, Halter & Griswold LLP

(57) ABSTRACT

Systems and methods for applying powder coating materials in electrostatic spray systems are provided. For example, a gravity feed of recovered powder coating from the recovery system to the feed system is disclosed. In addition, a powder feed system is disclosed wherein a powder suction lance assembly has only two operable positions, a first for feeding powder from a fluidized hopper and also corresponding to a purge position for a novel purge manifold, and a second retracted position for powder color changes and servicing. Also, a pump assembly block in physical communication with an air line attachment plate, a suction tube plate, and a hose manifold is disclosed. A plurality of attachment members removably attach the air attachment plate, a suction tube plate, and the hose manifold plate to the pump assembly block. Method for applying a first powder color and a second powder color in a powder feed center are also provided. The one method includes, among other things, the step of replacing a first pump assembly and with a second pump assembly that is in fluid communication with the one or more spray devices. The second pump assembly may be a new, previously cleaned, or color dedicated pump assembly. So configured, the present invention reduces the amount of time required for a powder color change in an electrostatic spray system and reduces color cross-contamination effects involved when changing between powder colors. Powder contacting surfaces are reduced, as well.

7 Claims, 19 Drawing Sheets

U.S. PATENT DOCUMENTS

| | | |
|---|---|---|
| 3,719,030 A | 3/1973 | Blankenmeyer et al. |
| 3,814,002 A | 6/1974 | Romback et al. |
| 3,905,785 A | 9/1975 | Fabre |
| 3,918,640 A | 11/1975 | Piccino et al. |
| 3,918,641 A | 11/1975 | Lehmann et al. |
| 4,153,008 A | 5/1979 | Marino et al. |
| 4,378,728 A | 4/1983 | Berkmann |
| 4,409,009 A | 10/1983 | Lissy |
| 4,430,956 A | 2/1984 | Koch, II |
| 4,504,292 A | 3/1985 | Vohringer |
| 4,537,120 A | 8/1985 | Josefsson |
| 4,704,953 A | 11/1987 | Wilson |
| 4,715,314 A | 12/1987 | Ramseier et al. |
| 4,770,089 A | 9/1988 | Vinicombe |
| 4,926,746 A | 5/1990 | Smith |
| 5,042,420 A | 8/1991 | Gerdes |
| 5,107,756 A | 4/1992 | Diaz |
| 5,153,028 A | 10/1992 | Shutic et al. |
| 5,256,201 A | 10/1993 | Gelain et al. |
| 5,275,634 A | 1/1994 | Kramer |
| 5,346,553 A | 9/1994 | Pingel |
| 5,421,885 A | 6/1995 | Trevisan |
| 5,615,980 A | 4/1997 | Mauchle |
| 5,681,390 A | 10/1997 | Lacchia |
| 5,766,355 A | 6/1998 | Josefsson et al. |
| 5,928,423 A | 7/1999 | Toyota et al. |
| 6,010,571 A | 1/2000 | Josefsson et al. |
| 6,461,431 B1 | 10/2002 | Ainsworth et al. |

FOREIGN PATENT DOCUMENTS

| | | |
|---|---|---|
| DE | 30 28 588 A1 | 2/1982 |
| DE | 34 08 014 A1 | 9/1985 |
| DE | 0 165 815 | 12/1985 |
| DE | 37 15470 A1 | 11/1988 |
| DE | 8907538 | 10/1990 |
| DE | 8907538 U1 | 10/1990 |
| DE | 295 18 478 U1 | 1/1996 |
| DE | 195 00 873 A1 | 7/1996 |
| DE | 195 17 229 A1 | 11/1996 |
| DE | 196 44 360 C2 | 4/1998 |
| EP | 0223 660 | 10/1986 |
| EP | 0 165 815 B1 | 5/1989 |
| EP | 0698421 A1 | 8/1994 |
| EP | 0 678 336 A2 | 3/1995 |
| EP | 0689 075 A2 | 1/1996 |
| EP | 0 701 868 A1 | 3/1996 |
| EP | 0 839 582 B1 | 5/1998 |
| EP | 0 839 583 B1 | 5/1998 |
| FR | 2 675 061 A1 | 4/1991 |
| FR | 2 724 583 A1 | 9/1994 |
| GB | 429028 | 5/1935 |
| GB | 2 120 303 A | 3/1983 |
| GB | 2141 7642 A | 1/1985 |
| WO | WO 95/10365 A1 | 4/1995 |
| WO | WO 99/12658 | 3/1999 |

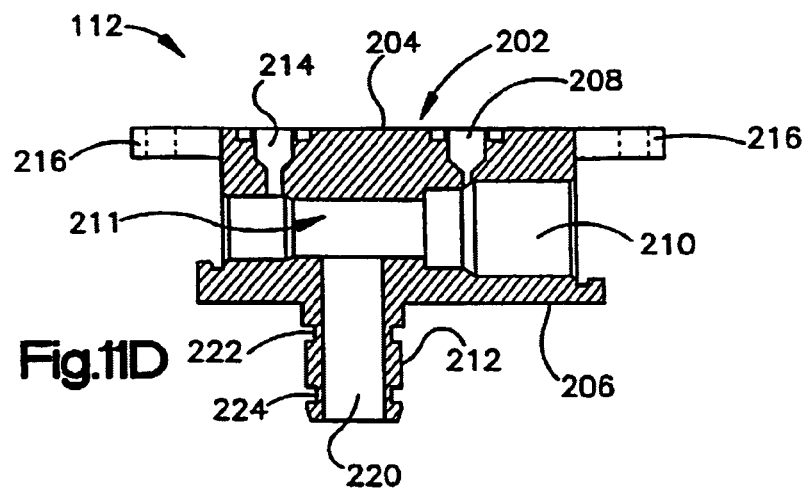
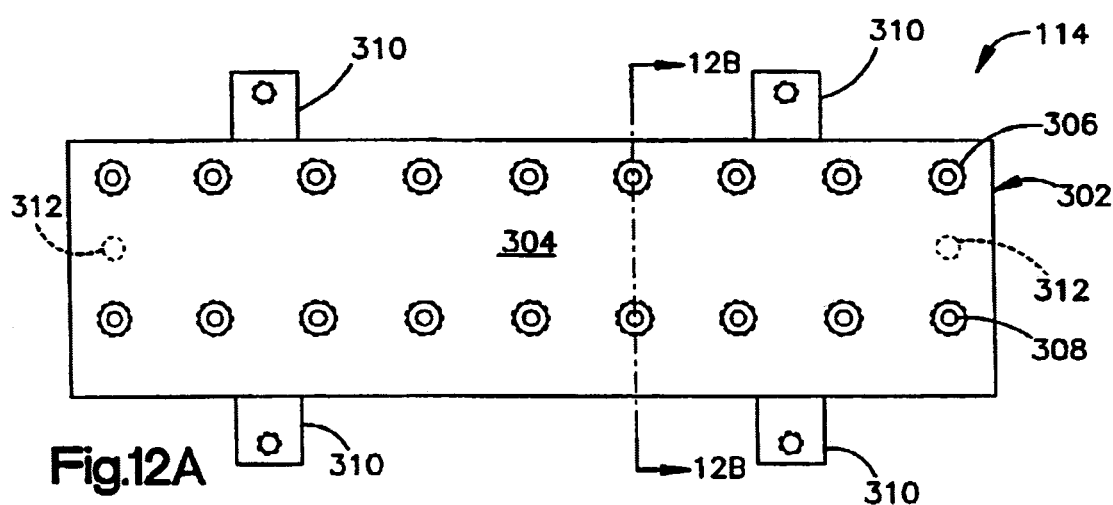
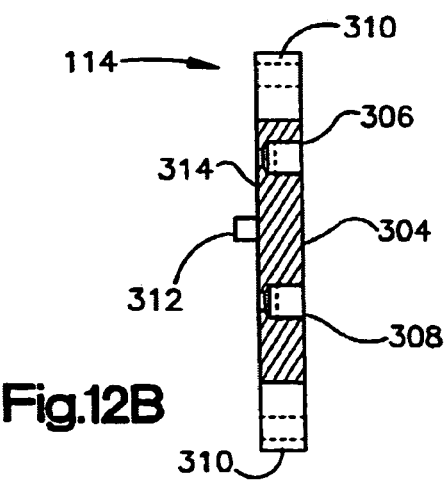

QUICK COLOR CHANGE POWDER COATING SYSTEM

RELATED APPLICATIONS

This application claims priority to U.S. Provisional Application No. 60/154,624, filed Sep. 17, 1999, the entire disclosure of which is hereby incorporated by reference herein.

FIELD OF THE INVENTION

The invention relates generally to powder coating spray systems, and more particularly, to methods and systems for facilitating the change of powder paints and coatings in such spray systems, including improved methods and apparatuses for the recovery and re-use of over-sprayed powder coatings in a spray booth, for feeding powder coatings to be sprayed, and for purging powder coatings from system components.

BACKGROUND OF THE INVENTION

Powder coating spray systems are used to apply powder paints and coatings to a variety of products including, for example, appliances automotive components, furniture and storage shelving, electrical transformers, and recreational equipment. These systems often apply the coating materials to such products electrostatically by using one or more electrostatic spray devices in a spray booth enclosure setting. A powder feed system is used to supply the coating material to the spray devices and a powder recovery system is typically employed to capture over-sprayed powder material for re-use. The recovered powder coatings may be transferred to a collection bin for later re-use or disposal.

Known powder recovery systems, especially those employed in larger production-type powder coating spray booths using a plurality of spray application devices, often use cyclone separators and/or filter elements for collection of over-sprayed powder coating material. Such a powder coating spray system using cyclone separators is disclosed in International Application Number PCT/GB98/02569, owned in common by the assignee of the present invention, the entire disclosure of which is fully incorporated herein by reference.

Cyclone separators used in powder recovery systems have either been very large single or dual side by side cyclones, multicyclones, or pairs of such cyclones having tangential or axial feed inlets.

In cyclones of the vertical feed type, the air entrained over-spray powder is fed vertically downwards from a common inlet manifold into the separators and a circumferential velocity is imparted to the air-entrained powder coating material by veins. In addition to the inlets, which are typically located in the booth walls near the ceiling, and are useful for capturing air-entrained powder coating material, intakes are sometimes provided near the floor of the powder spray booth. In such cases, a vertical channel connects the intake to the inlet to the cyclone which is near the ceiling of the booth. Such intakes are useful for recovering powder coating material from the area near the floor of the booth.

Sweeper devices may be employed to move over-sprayed powder coating material which has collected on the floor to a recovery intake. The sweeper device may take the form of a scraper bar which may be magnetically coupled to a drive positioned externally of the powder booth, such as is disclosed in International Application Number PCT/GB98/02569. The advantage of this is that the drive mechanism is outside the booth and therefore not covered by powder, and therefore it does not need to be cleaned when changing powder color.

To maximize the amount of powder which settles on the floor of the booth and can, therefore, be collected at the floor level cyclone intakes by the sweeper device, the booth walls and ceiling, or the booth canopy, are preferably made from non-conductive material. For example, the booth canopy may be made from a plastic material. Alternative materials include stainless steel.

In vertical cyclones, the over-spray powder is separated from the air by the combined effect of centrifugal and gravitational forces and falls to the bottom of the separators to be collected and removed. The cleaned air is then typically directed vertically upwards through ducts, one per cyclone separator, which pass through the center of the cyclone and into an exhaust manifold. The air then passes through a further powder, or dust, recovery unit containing one or more filter elements to remove any fine powder particles still entrained in the air, before being exhausted to atmosphere.

The captured powder coating material may be collected below the cyclones in a collection bin or hopper, for disposal or re-use. In addition, a sieve member may be employed between the cyclone exhaust at the cyclone's open throat end and the collection bin. Known sieve members are typically of similar size to the circular exhaust end of the cyclone. Known transfer means to deliver the captured powder from the collection bin, or hopper, located below the cyclone to a more distant collection hopper whereby the collected powder can be dumped into a feed hopper, is through a series of at least two pinch valves. Alternatively, an improved transfer means, found in International Application Number PCT/GB98/02569, comprises a venturi pump in combination with a mini cyclone. The known improved combination requires far less sophisticated controls than the dual pinch valve setup. Both methods still require cleaning of all surfaces contacted by the powder coating between powder coating color changes.

Known powder feed systems include a powder pump, a powder hose connecting the pump to a spray application device, and a pick-up, or suction, tube. Of course, there may be a plurality of such components. The suction tube may be inserted directly into a feed hopper or a virgin powder box. It is known to place the box, or hopper, on a vibratory table to provide continuous movement of powder and help break up any agglomerates. When a plurality of pumps, suction tubes and powder spray devices are employed, output can vary between pumps and can randomly surge, affecting powder coating application quality.

In such systems, changing the powder type (e.g., powder paint color) generally requires the cleaning of all system components that have come in contact with the previously applied powder. This cleaning process is intended to avoid the contamination of the new powder by the previously used powder. However, the longer it takes for the cleaning process to complete, the longer the spray system is off-line. The cleaning process completion time is dependent on a number of factors including, for example, the number of spray system components, their internal and external geometries that may have come in contact with the previously applied powder coating, and the type of powder. Hence, if the spray system includes a larger number of components having complicated or irregular geometries, the longer it takes to clean the system and the longer the spray system is "off-line" or not working. Long off-line times are very undesirable because they cause a decrease in overall spray system productivity. Hence, apparatuses and methods that minimize the time required for changing powder colors in powder coating systems are highly desirable.

SUMMARY OF THE INVENTION

According to the present invention, systems, apparatuses, and methods for efficiently supplying and using powder coating materials, in order to simplify systems and minimize powder contacting areas and over-sprayed powder in the system, are provided. These systems, apparatuses and methods are provided to facilitate color change operations for successive coating operations. For example, a novel powder coating spray system is provided. In a powder coating spray booth system of the type including one or more powder spray devices, a powder feed system including a feed hopper, and a powder recovery system to capture over-sprayed powder, a powder transfer conduit is provided which is connected at a first end to a reclaim powder collector of the powder recovery system, and at a second end, lower in elevation than the first end, to a powder feed hopper of the powder feed system. Such a set-up in its simplest form provides for direct gravity transfer of reclaimed powder back to the feed system for re-use by the spray application devices. Such a system minimizes the sophisticated controls necessary for the multiple pinch valve or venturi pump/mini-cyclone system described above. In addition to simplifying controls and minimizing internal component powder contacting surfaces, direct feed of the reclaimed powder to a feed hopper of the feed system is disclosed by the present invention.

Additionally, the inventive recovery system may include one or more cyclone separators fluidly connected to the booth via one or more inlets (preferably one per cyclone) connected via a channel to one or more intakes for recovering deposited coating material on the floor of the booth. The cyclones may have to be connected with one or more additional, optional intakes for airborne powder coating material located in a booth wall near the tope of the booth. These cyclones may exhaust captured powder coating material to a reclaim powder collector, or hopper. Interposed between the reclaim powder collector and the cyclone exhaust end, or open throat end, may be a sieving mechanism. The sieving mechanism may have an exciter device to excite the sieving member and facilitate the sieving function. To facilitate the gravity transfer of the captured powder of such a system back to the feed system, the reclaim powder collector may have an underlying fluidizing bed including a plenum, a fluidizing plate and a source of pressurized gas, such as air. In addition, at the interface of the reclaim powder collector and the powder transfer conduit, a selectively operable valve member, operable to allow captured powder to enter the powder transfer conduit in a first open position and to seal the reclaim powder collector in a second closed position, is provided. Furthermore, a sealing mechanism is provided to seal the cyclone exhaust at the open exhaust, or throat end of the cyclone separator, to isolate the cyclone from the reclaim powder hopper during a powder transfer operation. By fluidizing the powder with a source of pressurized gas and a fluidizing plate, the transfer rate and efficiency of reclaimed, or captured, powder to the feed hopper is significantly increased. Not only gravity, but the fluidization of the powder and pressure serve to facilitate the powder transfer in this inventive embodiment.

During cyclone operation, a vortex break device, such as an annular plate or valve member positioned across and perpendicular to the cyclone exhaust, or throat end, is provided in the present invention. The valved plate-like member can also be rotated to facilitate cleaning. In either case, such a device is smaller in diameter than an open conical cyclone's circular exhaust, or throat end, thereby creating an annular gap that allows the captured powder to be delivered along the interior cyclone wall through the gap to the reclaim powder collector. With a vortex break device, already captured powder is prevented from being re-entrained in the cyclone exhaust back through the center of the cyclone. With such a vortex break device, the sealing mechanism used to isolate the cyclone from the reclaim powder hopper, may take the form of an annular valve member or an inflatable annular seal device which selectively closes the annular gap.

In addition, bulk powder unloading into the process stream upstream of the sieve is provided by the inclusion of a powder inlet port for virgin powder unloading into the process stream up line of the sieving mechanism, but below the vortex break device. The sieving mechanism serves to screen out impurities and foreign materials, as well as to break up any agglomerates in the powder coating material. The virgin powder can then be transferred to the feed hopper via the powder transfer conduit already described, using gravity alone, or in combination with the fluidization plate and pressure.

To transfer either or both captured and virgin powder to a feed hopper of the feed system in one embodiment of the present invention, the cyclone would be isolated with respect to the reclaim powder collector and sieving mechanism. Isolation would occur by sealing, such as by inflation of an annular seal member around the circumference of a butterfly type valve, or by a pinch-type or iris valve, to seal the cyclone with the vortex break device. A valve member would then be opened at a lower elevation of the reclaim powder collector at the interface with the powder transfer conduit. The powder coating material in the reclaim powder collector would be fluidized, whereby the fluidized powder coating material is transferred to the feed hopper via the powder transfer conduit under the influences of gravity and pressure.

In some configurations with one or more cyclones near each end of a spray booth, it may be desirable to have one or more of the cyclones, or sets of cyclones, to be mounted in a tilted configuration with respect to the vertical. This may be desirable to raise the cyclone exhaust end, and subsequent reclaim powder collector height, to facilitate gravity transfer of reclaimed powder over longer horizontal distances, back to feed hoppers positioned near opposite side walls of a spray booth, for example.

The present invention provides for an improved powder feed system and interface of the feed system with the spray booth. A lance assembly is provided including one or more each of powder suction tubes and powder pumps. The powder pumps may be novel venturi-type pumps, as discussed in more detail below. Typically a powder supply conduit is provided to connect each pump with a spray application device in the spray booth. The lance assembly of the present invention is operable to move from a first lower position to a second higher position, such as by a controller, an actuator and one or more guide rods wherein the lance assembly may slide vertically from the lower to the higher position along the guide rod, or rods. The lower position corresponds to a position wherein the one or more powder coating suction tubes each have an open powder intake end proximate a lower elevation within a powder supply. Powder feed is accomplished in this lower position, simplifying the controls of known systems, wherein the powder suction tubes must be repositioned within the powder supply during a powder spray coating operation.

The powder supply for the present invention may be any bin, or box of powder, and may be placed on a vibratory table, as described above. More preferably, the powder coating material supply to the feed system will take the form of a rollable fluidizing bed powder hopper directly connecting with the powder transfer conduit of the recovery system, as described above. The fluidizing hopper includes a source of pressurized fluidizing gas, such as air, a fluidizing plate and a hopper body. The fluidizing plate may be made of a sintered material, such as polyethylene, or other plastic. The fluidizing powder hopper of the present invention can have a containment lid to seal the hopper about the installed lance assembly. In such a configuration, there may be a vent connecting the hopper to the interior of the spray booth for venting the excess pressure.

Inventive apparatuses and methods for cleaning the powder feed system of the present invention are also disclosed. The lance assembly can be raised to its higher position, the rollable fluidizing hopper can be disconnected from the booth, powder transfer conduit, source of fluidizing gas, and rolled out the way. A purge manifold can be moved into position and the lance assembly can be lowered to its lower position, wherein each open powder coating suction tube end of the lance assembly will engage with a purge port, or nozzle of the purge manifold. The purge system can be activated with the spray devices connected to the system, and the internal surfaces of the feed system from the lance through to the gun can be readily purged and cleaned of any powder adhering to the internal surfaces of the powder flow path. Such a purge manifold connected to a purge gas, would preferably be swingable from a first stowed position to a second purge position wherein the lances could meet with it in the lower position of the lance.

Furthermore, the feed system of the present invention can be located proximate a side wall section of the booth. The area surrounding the feed system can be made ventable directly to the cyclone exhaust. A plenum area spaced from the booth side wall and a perforated screen section, or other porous side wall section communicating with the plenum area, to diffuse the air entering the plenum area when the cyclones are running and exhausting air, is provided. Connectivity with the cyclone exhaust ducting and out through the last stage dust filters of the booth powder recovery system is made via a powder feed center damper which is a dampered inlet from the plenum area to the cyclone exhaust ducting. In such a configuration, to clean the powder feed section, the powder feed center damper can be opened allowing air external to the spray booth to communicate through the perforated screen and into the plenum area and then into the cyclone exhaust ducting. With the cyclones running, the feed system external surfaces can be blown down with an air lance proximate the perforated screen and plenum area. Any loosened powder will flow through the screen, into the plenum and out the cyclone exhaust ducting to be filtered before the transport air is exhausted to atmosphere. During a coating operation, the damper will normally be closed thereby preventing external air from communicating with the interior of the plenum area and reducing cyclone efficiency.

An apparatus for supplying powder coating materials having a pump assembly block in fluid communication with and physically attached to an air line attachment plate, a suction tube plate, and a hose manifold plate is provided. A plurality of attachment members removably attach the air line attachment plate, suction tube plate, and hose manifold plate to the pump assembly block. The attachment members can be conventional fasteners such as, for example, screws or similar devices, and/or resilient o-rings.

The pump assembly block includes, for example, two or more pump chambers machined into the block. The two or more pump chambers are each capable of receiving a removable venturi throat member. Each pump chamber has a powder inlet port, a diffuser air inlet port, and an ejector air inlet port. The air line attachment plate has a diffuser air passage and an ejector air passage for each diffuser air inlet port and ejector air inlet port of the pump assembly block. A plurality of attachment members secure the air line plate to the pump assembly block in an assembled position and release the air line plate from the pump assembly block into a disassembled position. The diffuser air passages and ejector air passages of the air line plate communicate with the diffuser air inlet and ejector air inlet ports of pump assembly block when the pump assembly block and the air line plate are in the assembled position. An air line connects each of the diffuser air passages and ejector air passages of the air line plate to a regulated compressed air source.

According to another aspect of the present invention, a method of applying a first powder color and a second powder color from a powder feed center is provided. The method includes, for example, the steps of: applying the first powder color through a first pump assembly and a first hose manifold plate in fluid connection with one or more spray devices, ceasing the application of the first powder color, replacing the at least one of the first pump assembly and the first hose manifold plate with a second pump assembly and a second hose manifold plate in fluid communication with the one or more spray devices; and applying the second powder color through the second pump assembly and the second hose manifold plate. In this manner, the time required to implement a powder change and the amount of color cross-contamination is greatly reduced.

To facilitate collection of powder coating material that has fallen to the spray booth floor, an improved floor sweeper system is also disclosed in the present invention. Included in the preferred rectangular floor of the booth are one or more collection troughs, each of which is located in the floor between the cyclone powder intakes and the one or more spray devices. The sweeper substantially spans the width of the booth from the first side wall to the second opposed side wall. The sweeper is controlled to run back and forth across the booth floor via magnetically being coupled to one or more drive tracks positioned under the booth floor, or proximate the booth side walls near the floor. Such a configuration makes cleaning easier, as a sweeper used for one color of powder coating material can be exchanged for a cleaned sweeper in preparation for a color change operation. Preferably, there will be two collection troughs, each having a bottom that is slanted in elevation from a first end proximate the first side wall to a second lower end proximate the second side wall. The bottoms of the troughs may further include a fluidized bed connected to a source of pressurized gas, whereby the collection troughs each form a fluidized slide for collected powder. Powder collected by the floor troughs can be deposited in either removable collection bins or be sent directly to feed hoppers of the feed system. Alternatively, the powder can be first sent to a collection bin and then transferred to the feed hoppers by transfer means, such as a series of pinch valves, as previously described above for known powder transfer from cyclone collectors to hoppers or bins.

Additionally, an inventive spray booth explosion door is provided. The explosion door has a first section hingedly attached to a wall and in communication with the cyclone inlet. It is operable to vent the inlet of the cyclone in the event of a first over-pressure condition within the booth, such as caused by a deflagration. The explosion door has a second, larger section hingedly attached to the booth wall and operable to vent the cyclone in the event of a second, larger over-pressure condition within the cyclone. The hinges retain or capture the door sections in the event of a deflagration and allow the door sections to be opened to facilitate cleaning of the booth during a color change.

It is, therefore, one objective of the present invention to provide a system and method that reduces the time required when changing from a first powder color to a second powder color in a powder coating system.

It is a further objective of the present invention to provide a method of reducing the cross-contamination that occurs when changing from a first powder color to a second powder color in an electrostatic spray system.

BRIEF DESCRIPTION OF THE DRAWINGS

In the accompanying drawings, embodiments of the invention are illustrated, which, together with a general description of the invention given above, and the detailed description given below, serve to illustrate the various features of this invention.

FIG. 11D is sectional view of the pump assembly block of FIG. 11A taken along line 11D—11D.

FIG. 12A is top view of an air line attachment plate of the present invention; and FIG. 12B is a sectional view of the air line attachment plate of FIG. 12A taken along line 12B—12B.

DETAILED DESCRIPTION OF ILLUSTRATED EMBODIMENT

Figure 1:
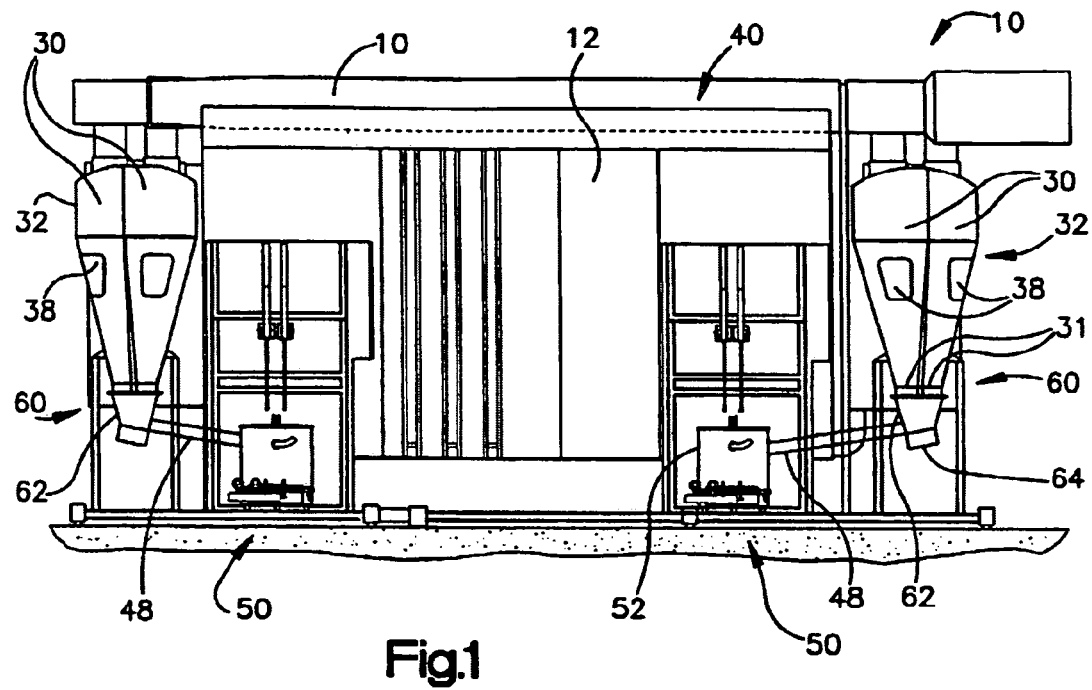
FIG. 1 is a side view of an embodiment of the spray booth system of the present invention.
Figure 2:
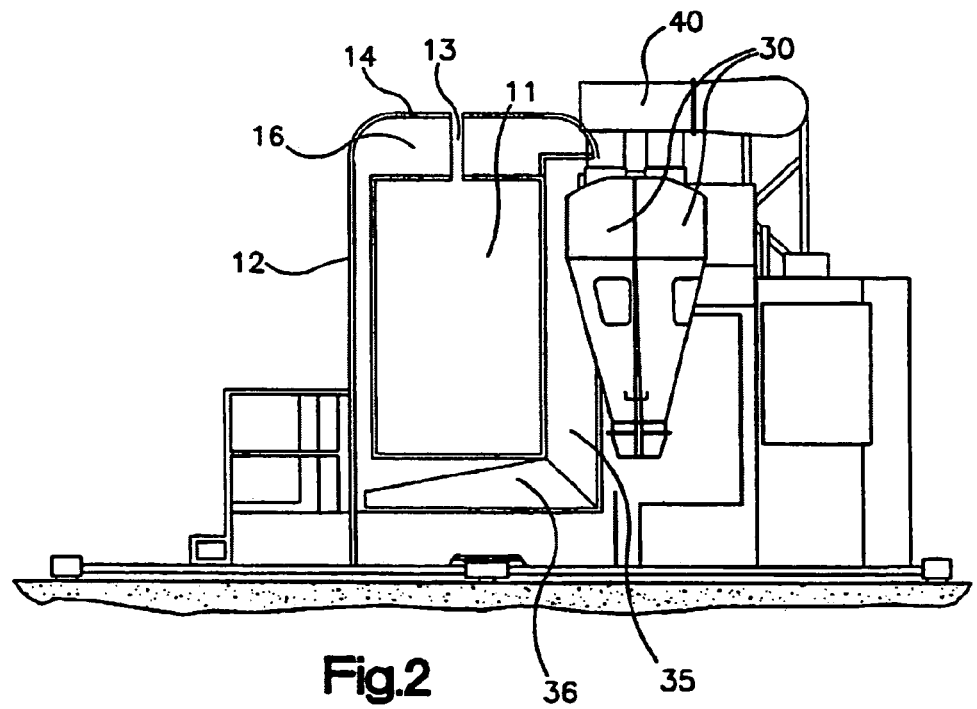
FIG. 2 is an end view of the booth system of FIG. 1.
Figure 3:
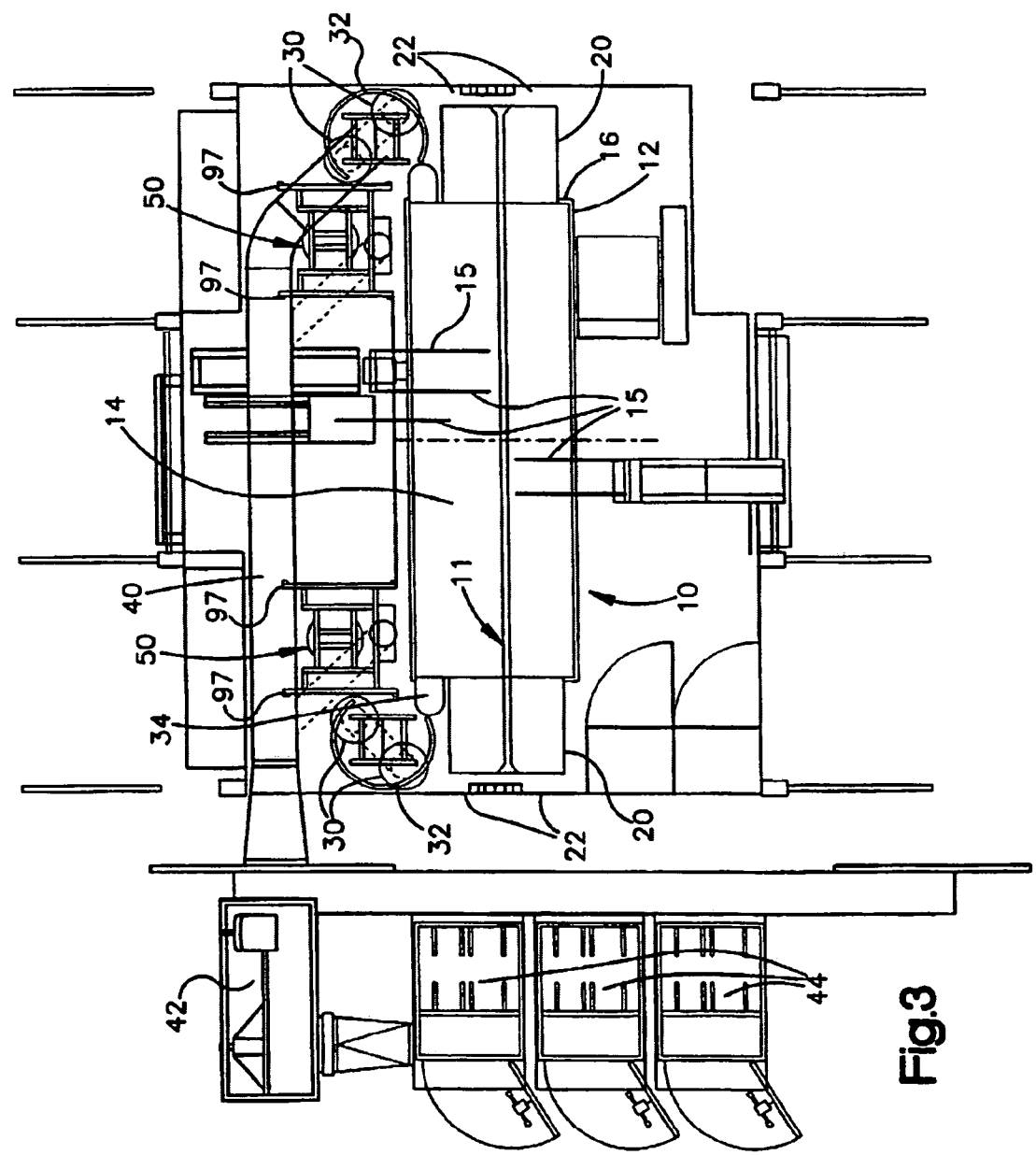
FIG. 3 is a top view of the booth system of FIGS. 1 and 2.
Figure 19:
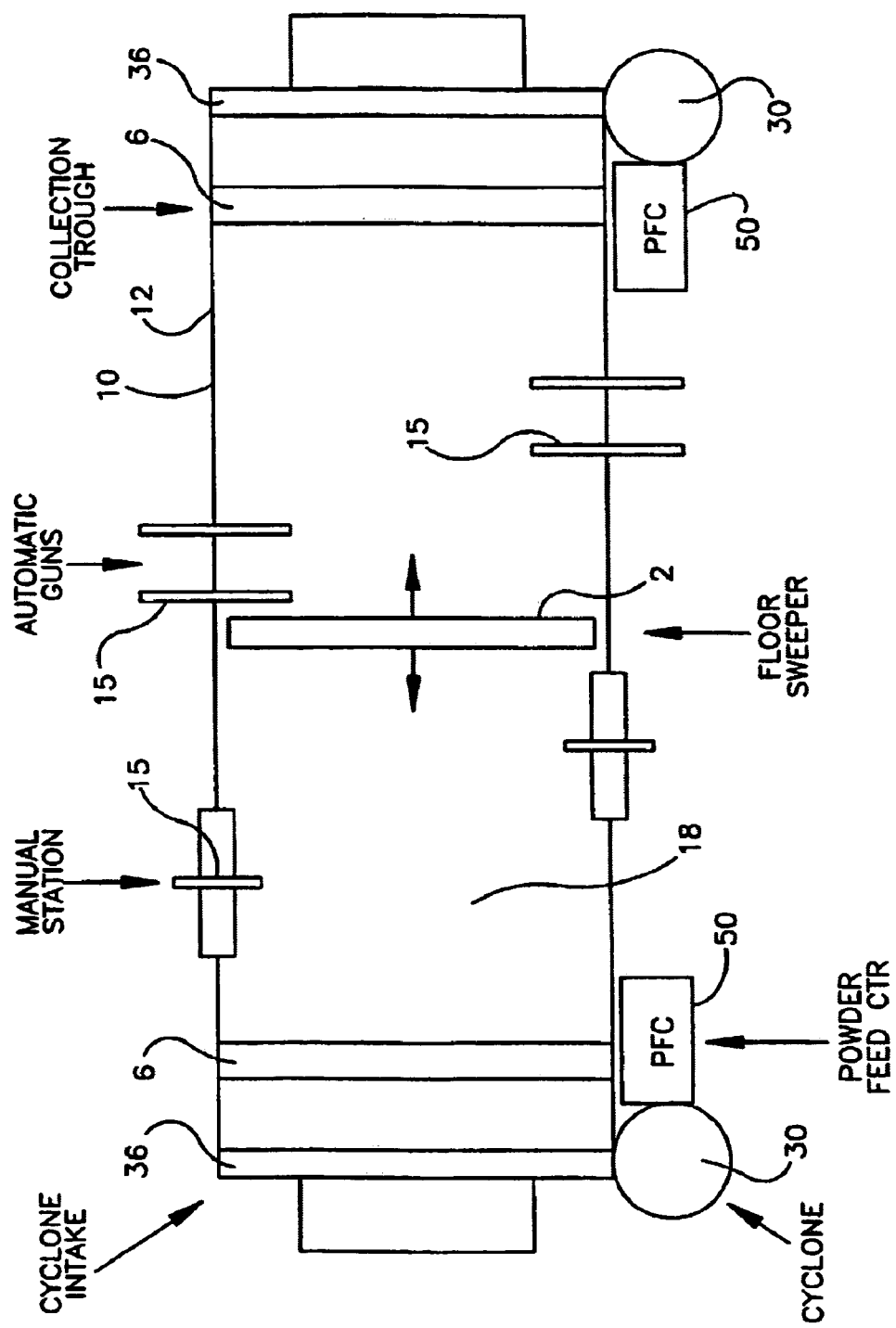
FIG. 19 is a cut-away top view showing the floor sweeper and troughs 6 of the present invention.
Figure 20:
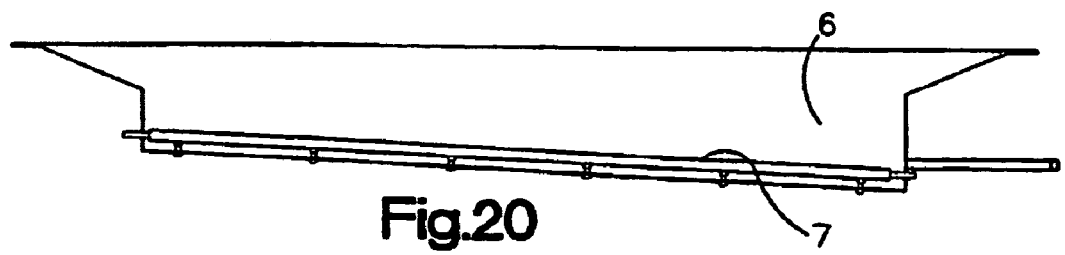
FIG. 20 is a detailed side sectional view of the troughs 6 illustrated in FIG. 19.
Figure 21:
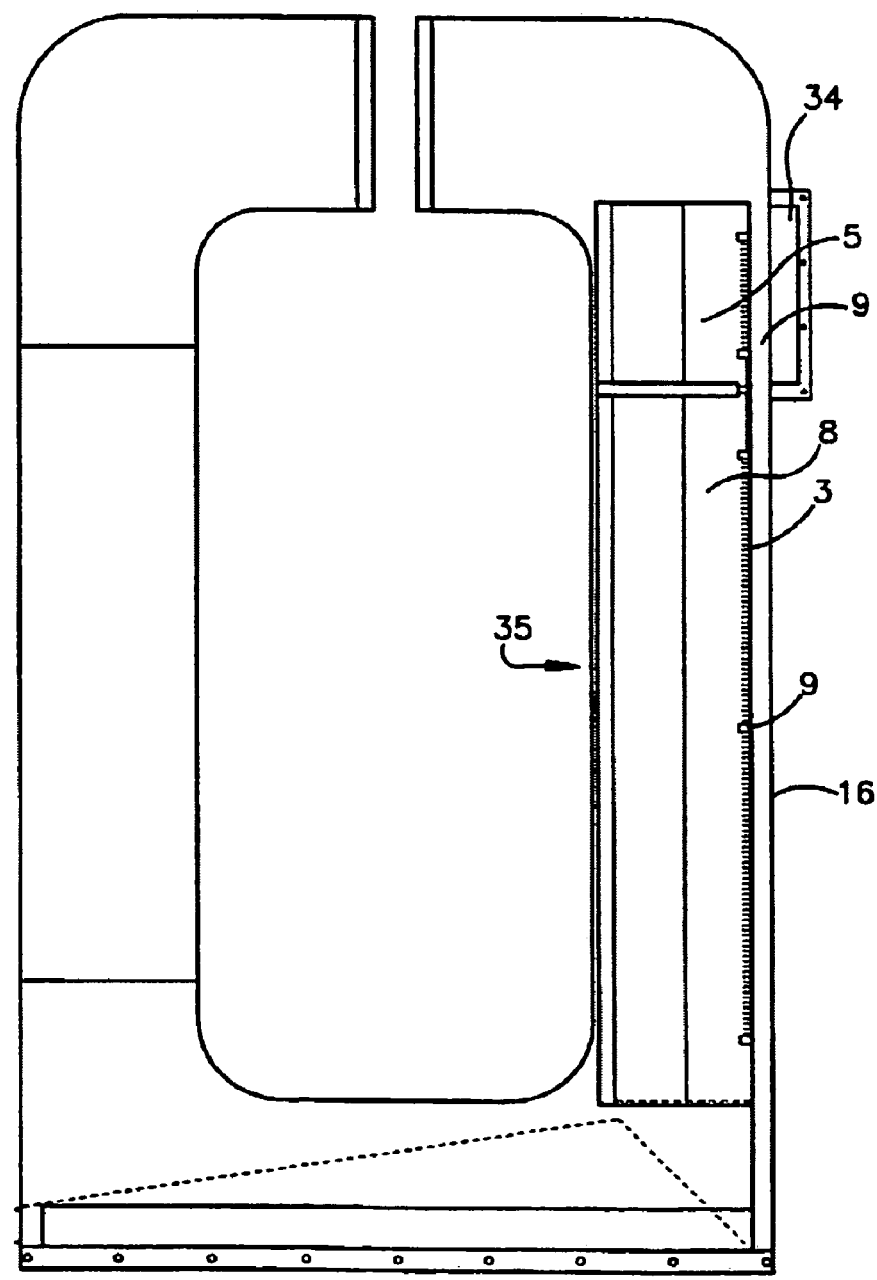
FIG. 21 is a partial sectional view of the booth end wall as viewed from inside the booth disclosing the explosion door 3 of the present invention.

Referring now to FIGS. 1–3, a powder coating spray booth 10 is shown. The powder coating spray booth is typically substantially rectangular and the upper part or canopy of the booth which forms the walls and ceiling are made of a non-conductive material such as plastic. Since the powder coating materials are typically applied by electrostatic application devices and are charged thereby, the non-conductive booth wall and ceiling materials prevent the majority of over-sprayed coating materials from adhering to the booth walls and ceiling, thereby facilitating cleaning between color changes. Interface regions for booth interior adjacent connecting surfaces are often radiused to facilitate cleaning and prevent powder coating materials from sticking or becoming entrapped in sharp angled areas. Alternative booth materials include stainless steel. Combinations of such materials may be preferable for booth construction. For example, constructing the booth canopy, which consists of side walls 12, ceiling 14, end walls 16 of plastic for cost savings, while constructing the floor 18 (see FIG. 19) and the optional vestibule extensions 20 with attached booth doors 22 of stainless steel for added durability may be desirable.

The booth may have openings 13 for parts to be spray-coated to be conveyed through the booth 10 via conveyor slot 11 in the ceiling 14.

The powder coating spray booth system can include one or more conical-bodied cyclone separators 30 to facilitate recovery of over-sprayed powder coating material within the booth. The cyclone separators 30 may be mounted on a rollable fixture to facilitate cleaning and maintenance. Shown in FIG. 1 are four cyclone separators 30 in one configuration consisting of opposed pairs 32 of cyclone separators 30 each located near an end wall 16 of the booth 10. Cyclones 30 are preferably made of stainless steel to facilitate cleaning between powder coating material color changes. The cyclone separators 30, preferably of the vertical feed type with tangential inlets, are connected to the booth 10 via one or more intakes 36 connected via channels 35 to the cyclone inlets 34. The cyclones may each have one or more access doors 38 to facilitate cleaning. In another embodiment (not shown), there may be a single pair 32 of cyclones 30, one cyclone 30 for each intake 36, the pair 32 located near the midpoint of one of the two sidewalls 12.

In a preferred embodiment illustrated, the cyclone inlets 34 are located near confluence of the ceiling 14 and the end walls 16. See FIGS. 3 and 4. Oversprayed powder does not pass directly from the booth into these inlets. Instead, oversprayed powder is collected at floor level intakes 36 which are connected by channels 35 to the cyclone inlets 34. The intakes 36 recover powder coating material over-spray at the floor 18 of the booth 10 and are located proximate the floor 18, either in the floor 18, in the end walls 16 proximate the floor 18, or in an interface region of the end walls 16 and floor 18. There is a cyclone inlet 34 for each cyclone 30 in the pair 32. One intake 36 is connected with the pair of cyclone inlets 34 via a channel 35. Optionally (not shown), two separate channels 35, one for each cyclone intake 34, could be connected to the intake 36. The intakes 36 may each be optionally tapered (FIG. 2) such that an end further from the channel 35 is narrower than an end closer to the channel. This will ensure more even suction throughout the intakes 36. Each inlet and intake pair 34, 35 are connected to one of the pairs of cyclones 32. Both cyclones 30 of each pair 32 connect to the channel 35. Of course, the channels may each be optionally tapered as well (not shown).

In an alternative embodiment (not shown, but similar to that described in International Application Number PCT/GB98/02569), there may be optional intakes for capturing air-entrained powder coating material over-spray within the booth 10 located near the ceiling 14 in the end walls 16. The floor intakes 36s, on the other hand, are for recovering powder coating material over-spray within the booth 10 located near the ceiling 14 in the end walls 16. The floor intakes 36, on the other hand, are for recovering powder coating material over-spray that has already fallen to the floor 18 of the booth 10 are thus located proximate the floor 18, either in the floor 18, in the end walls 16, proximate the floor 18, or in and interface region of the end walls 16 and floor 18, as described above. Both types of intakes would be connected to the cyclone inlets 34 such as by the same channels 35, or by separate such channels.

In the illustrated embodiment, the cyclone separators 30 share common exhaust ducting 40. One or more dust filters, or final stage filtration devices, 42, are in fluid communication with the ducting 40. Suction means 44, such as may be provided by one or more high flow exhaust fans draw powder entrained air from within the booth 10 through the cyclones 30, the ducting 40 and the filters 42, before the cleaned air is exhausted to atmosphere.

In addition, the powder coating spray booth 10 will have one or more spray application devices 15 positioned with respect to one or both booth side walls 12, a powder feed system, shown generally at 50, and a powder recovery section below the cyclones, shown generally at 60.

A powder transfer conduit 48 (see FIG. 4) is provided in the present invention connecting the powder recovery section 60 to the feed center 50. More specifically, the powder transfer conduit 48 connects at a first higher elevation end with a lower elevation of the slanted bottom of the reclaim powder collector 62, and at a second lower elevation end to a powder feed hopper 52. Such a set-up in its simplest form provides for direct gravity transfer of reclaimed powder back to the feed system 50 for re-use by the spray application devices 15. Cyclone based recovery systems heretofore known have required pneumatic conveying equipment to return reclaimed powder to the feed hopper for the guns. Transfer pumps used for this purpose added complexity and cost to known systems in the art. The inventive gravity fed system employing the powder transfer conduit 48 improves upon and simplifies the known systems, such as those employing multiple pinch valves or a venturi pump in combination with a mini-cyclone as earlier described (not shown). In addition to simplifying controls, direct gravity feed of the reclaimed powder to a feed hopper 52 of the feed system 50 reduces powder contacting surfaces and corresponding cleaning time between powder coating material color changes.

In the illustrated embodiments, there is a common reclaim powder collector 62 for each cyclone pair 32. The reclaim powder collectors 62 collect powder coating material captured by the cyclones 30. The coating material is separated in the cyclones 30 via the effects of centrifugal force, friction and gravity, and falls out the open smaller diameter end of the cyclones' cones. We refer to this smaller diameter end of the conical-bodied cyclones 30 as the cyclone open end, or throat end, 31. The reclaim powder collectors 62 are located below the cyclones 30. In the illustrated embodiment, each pair 32 of cyclones 30 share a common reclaim powder collector 62.

Interposed between the reclaim powder collectors 62 and the cyclones' exhaust, or open throat ends 31 is a sieving device 63. In the illustrated embodiment, the sieving device 63 takes the form of a very fine mesh screen, made of stainless steel or other suitable material, with an exciter device 69 to excite the screen and facilitate the sieving function. The exciter device 69 may generate a vibratory input, an ultrasonic input or a combination of both to the sieving device 63.

Figure 4:
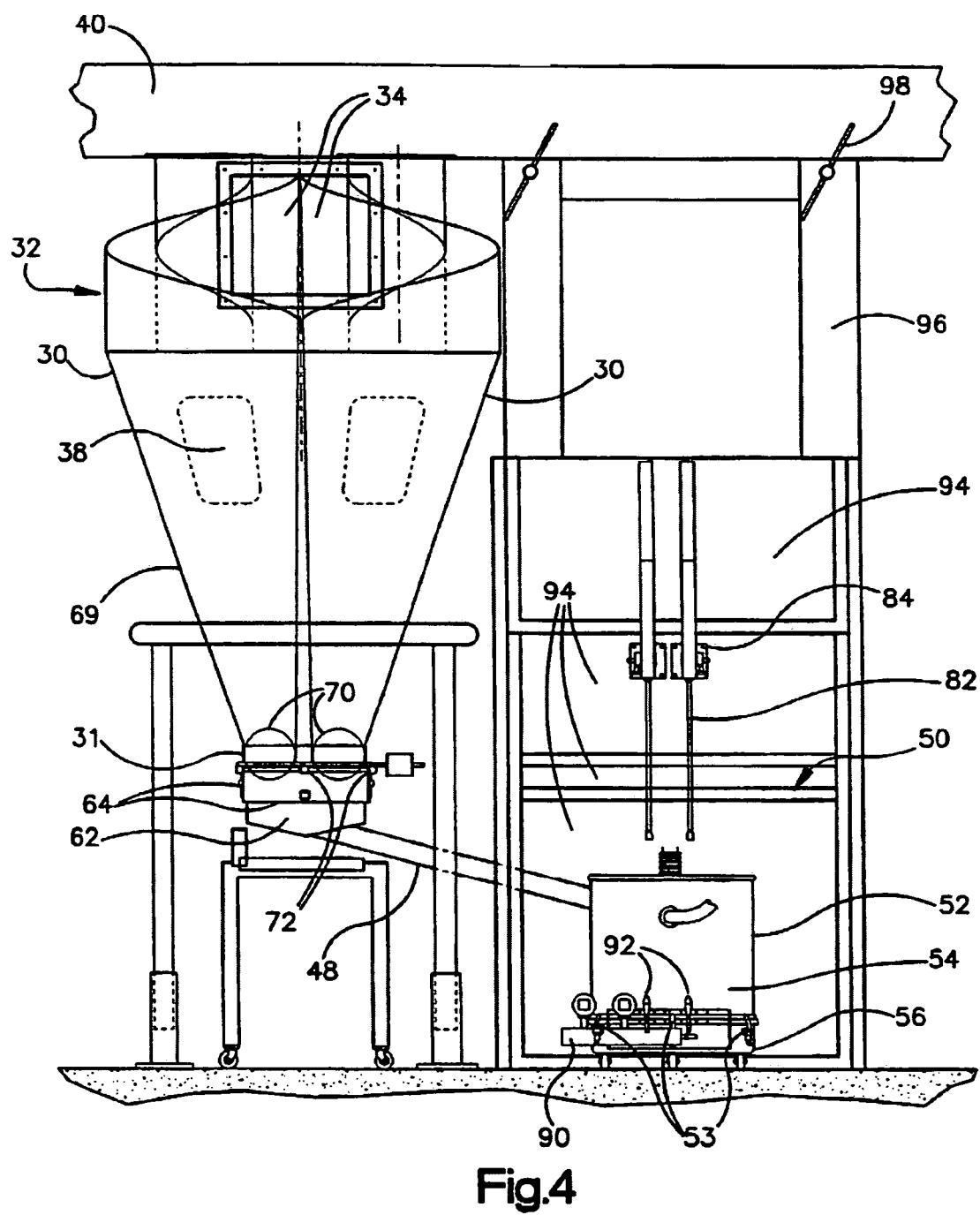
FIG. 4 is an enlarged partial view of FIG. 1, detailing the cyclone pair 32 and feed center 50 of the left-hand side of FIG. 1.
Figure 5:
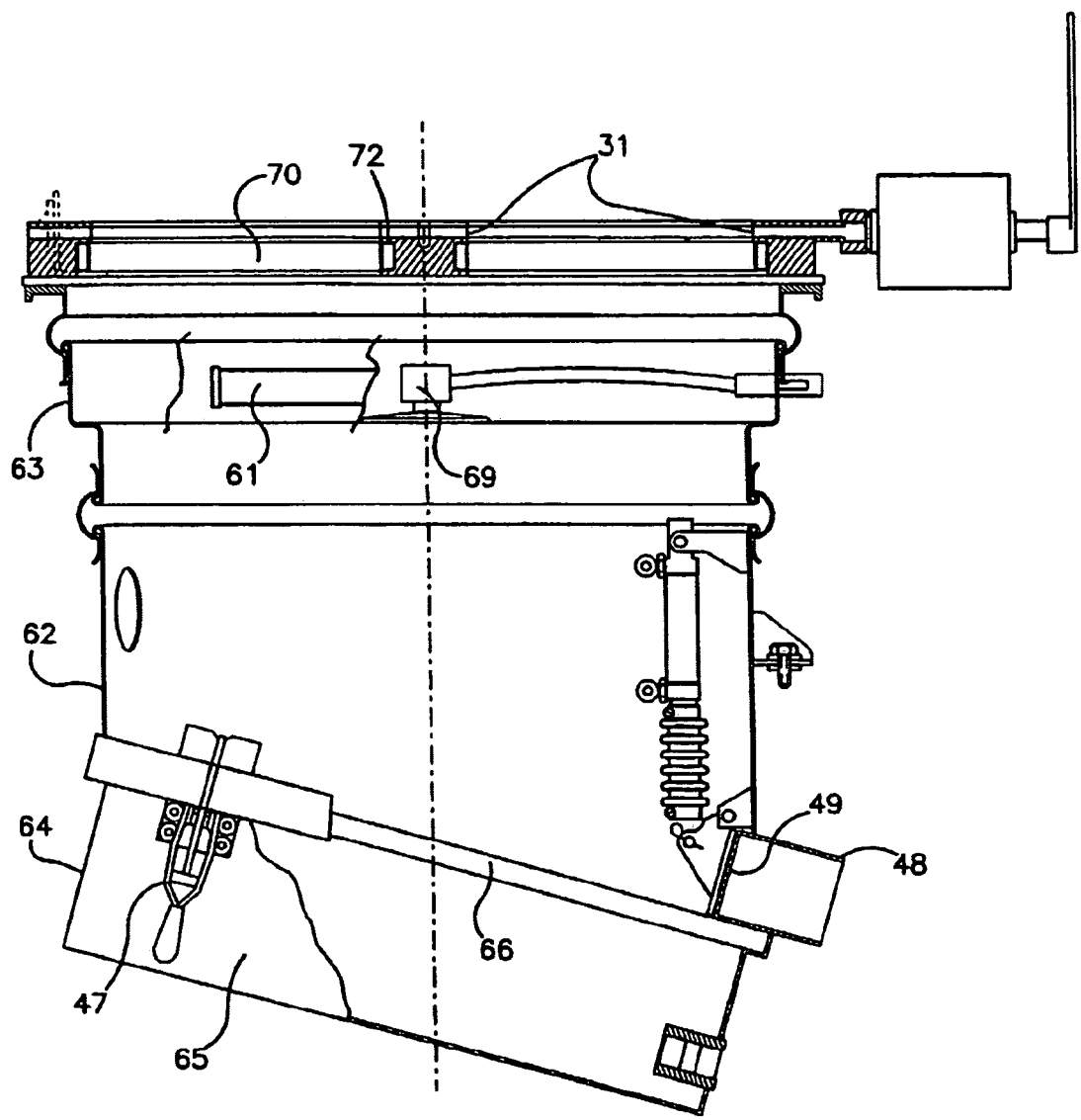
FIG. 5 is a further enlarged partial view of an embodiment of the powder recovery system components of the present invention from FIG. 4, showing one embodiment of a virgin powder input coupling 61.
Figure 6:
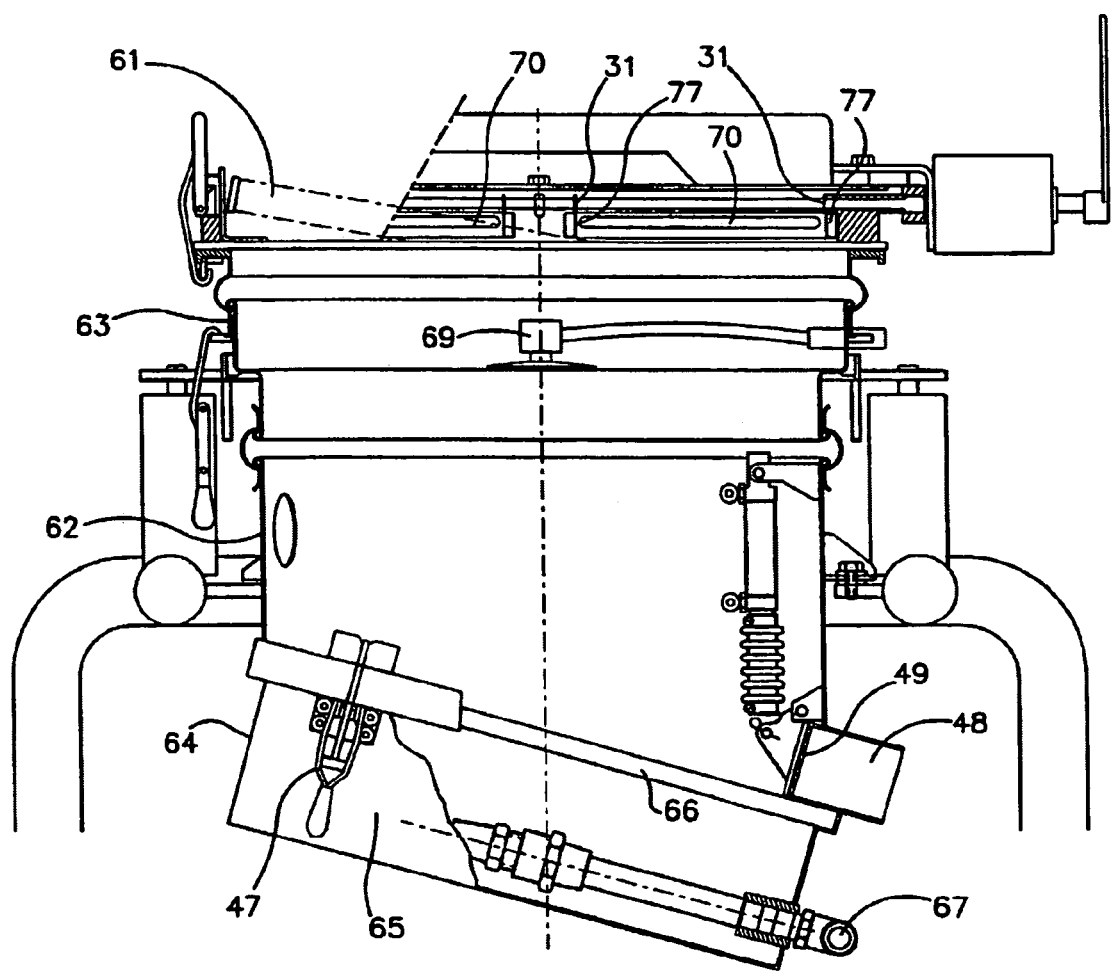
FIG. 6 is similar to FIG. 5, but with an alternate embodiment of a virgin powder input coupling 61.

Referring now to FIGS. 4–6, an apparatus to fluidize the captured powder in the reclaim powder collector 62 and facilitate gravity transfer to the feed hopper 52, or each of the feed hoppers 52 (FIGS. 1 and 3) of the feed system 50, is provided. The reclaim powder collector 62 has an underlying fluidizing bed 64 including a fluidizing plenum 65, a fluidizing plate 66 and a connection 67 to a source of pressurized gas (not shown), such as air. The fluidizing bed 64 is releasably connected to the reclaim powder collector 62 such as by one or more latching mechanisms 47. In addition, at the interface of the reclaim powder collector 62 and the powder transfer conduit 48, a selectively operable valve member 49 is disclosed. Valve member 49 is preferably a simple flapper-type valve and operable, such as by pneumatic actuation, to allow captured powder to enter the powder transfer conduit 48 in a first open position and to seal the reclaim powder collector 62 in a second closed position.

Furthermore, a sealing mechanism is provided to seal the cyclone exhaust at the open exhaust, or throat end 31 of each cyclone separators 30, to isolate the cyclone 30 from its corresponding reclaim powder hopper 62 during a powder transfer operation. The sealing mechanism can be a simple valve member, operable to effectively seal each cyclone throat 31, but more preferably takes the form of a vortex break device in combination with a sealing member, as further described below. By isolating the cyclone exhaust end 31 from the reclaim powder collector 62, and by fluidizing the powder in hopper 62 with a source of pressurized gas and a fluidizing plate 66, the transfer rate of reclaimed powder from the reclaim hopper 62 to the feed hopper 52 is significantly increased. Not only gravity, but the fluidization of the powder and the fact that the fluidizing air pressurizes the reclaim hopper 62 once it is sealed from the cyclones 30 facilitates the powder transfer in this inventive embodiment, since the powder is not only being fed by gravity through tube 48 but is also being pushed through the tube 48 by the pressurization of hopper 62.

Figure 7A:
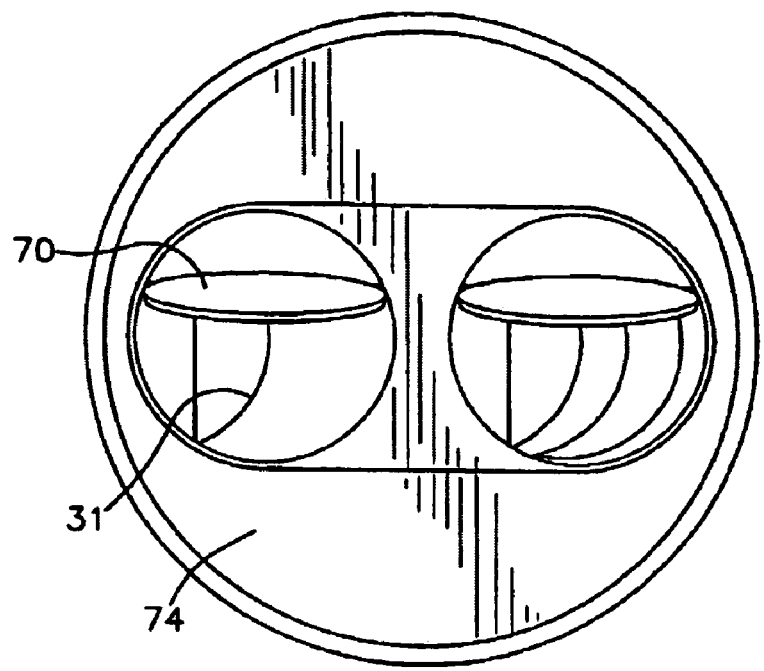
FIGS. 7A and 7B show the vortex break device 74 in a valved embodiment in the open and closed positions, respectively.
Figure 7B:
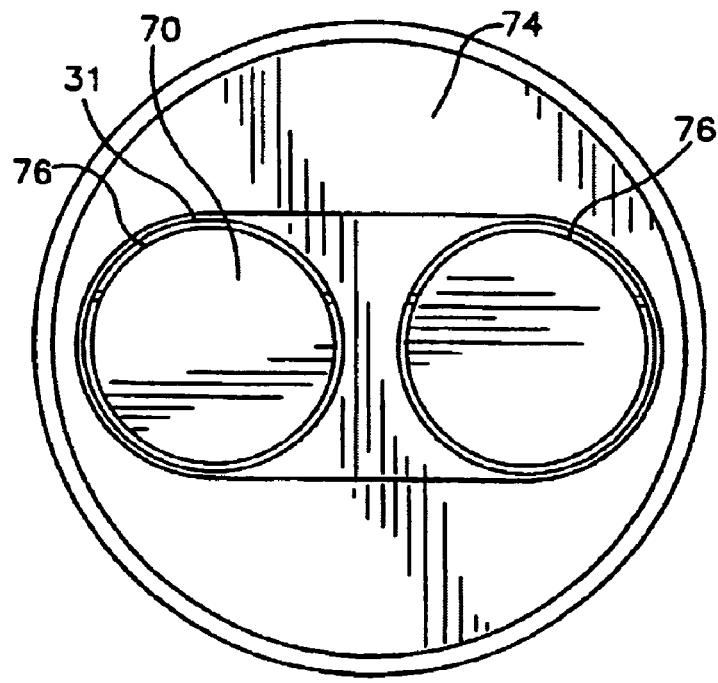

During cyclone operation, a vortex break device 70, such as an annular plate or valve member normally positioned across and perpendicular to the cyclone exhaust, or throat end, 31 is provided in the present invention. See FIGS. 7A and 7B. In a preferred embodiment, the vortex break device 70 takes the form of a butterfly-type valved member that can also be rotated to an open position relative to the cyclone throat end 31 to facilitate cleaning. The vortex break device 70 is slightly smaller in diameter that the cyclone throat end 31, thereby creating an annular gap 76 between the device 70 in the closed position and the end 31 that allows the captured powder to be delivered through the gap 16 along the interior of the conical cyclone wall to the reclaim powder collector 62. With a vortex break device such as 70 in place, already captured powder which has passed through gap 76 is prevented from being re-entrained in the cyclone exhaust back up through the center of the cyclone 30. To utilize such a vortex break device 70 as a sealing mechanism which pneumatically isolates the cyclone 30 from the reclaim powder collector 62 and the sieving member 63, an annular valve member in the form of an inflatable annular seal device is employed to seal gap 76 when powder is being transferred from hopper 62 to hopper 52. This is best illustrated in FIG. 5 as item 72.

An interface plate 74 (FIGS. 7A and 7B) provides the interface, or connecting member for mating the cyclone throat ends 31 of a cyclone pair 32 to the sieving device 63. Interface plate 74 also retains the vortex break devices 70 and the annular seal devices 72. To facilitate cleaning, interface plate 74 is releasably attached to sieving device 63, which in turn is releasably attached to reclaim powder collector 62, such as by latching mechanisms 47 previously described to attach reclaim powder collector 62 to fluidizing bed 64.

A further benefit of the inventive design is that bulk powder, or virgin powder, can be unloaded upstream of the sieving device 63 without significant loss due to the negative pressure effects of the cyclone. The sieving device 63, which is preferably circular as illustrated and may take the form of a simple vibratory deck screen with a vibratory-type exciter device 69, is much larger than the diameter of the cyclone throat 31. In view of the substantial isolation of cyclone 30 by the vortex break device 70, bulk transfer of virgin powder onto the top of the sieving device 63 can be done. FIGS. 5 and 6 show alternative embodiments of the positioning of a virgin powder input coupling, or port, 61 for this purpose. The sieving mechanism 63 serves to screen out impurities and foreign materials in the virgin powder, as well as to break up any agglomerates in the powder coating material in delivering virgin powder from port 61 to reclaim hopper 62. The virgin powder can then be transferred from hopper 62 to the feed hopper 52 via the powder transfer conduit 48 already described, using gravity alone, or in combination with the fluidization plate 66 and pressure.

A method is thereby disclosed wherein to transfer either or both reclaimed and virgin powder to a feed hopper 52 of the feed system 50 in an embodiment of the present invention, the powder would be sieved and stored in the reclaim powder collector 62. The cyclones 30 would be isolated with respect to the reclaim powder collector 62 and sieving mechanism 63. Isolation would occur by sealing, such as by inflation of the annular seal member 72, or by a pinch-type or iris valve, to seal the cyclone 30 at the throat 31 with the vortex break device 70. Alternatively, in embodiments not using a vortex break device, a sealing mechanism (not shown) to seal the entire throat 31 to isolate the cyclone 30 from the reclaim powder collector 62, may be employed. A valve member, such as illustrated and described as reference 49 would then be opened at a lower elevation of the reclaim powder collector 62 at the interface with the powder transfer conduit 48. The powder coating material in the reclaim powder collector 62 could then be fluidized by a pressurized gas, such as air entering plenum 65 and diffusing through fluidizing plate 66, whereby the fluidized powder coating material is transferred to the feed hopper 52 via the powder transfer conduit 48 under the influences of both gravity and pressure. Of course gravity feed alone may work fine, without fluidization of the powder, especially where a steep angle between the reclaim powder collector 62 and the feed hopper 52 can be maintained for the powder transfer conduit 48.

Valve member 49 remains in the closed position shown in FIG. 5 when powder coating material is not been transferred from recovery hopper 62 through tube 48 to feed hopper 52. This in effect seals the chamber 62 so that when the powder passes from the cyclones 30 through gap 76 into hopper 62 the powder is passing into a closed chamber. If tube 48 were not sealed off by valve 49 it is possible that an air flow could be drawn from the tube 48 through hopper 62 and up through the gap 76 into the cyclones 30. This would cause some of the recovered powder in hopper 62 to be reentrained into the powder and air mixture swirling about in the cyclones which would reduce the separation efficiency of the cyclones.

Note that a hole is shown in the wall of the hopper 62 in FIGS. 5 and 6. This hole is used for the purpose of mounting a level sensor in hopper 62. If the level sensor in the hopper 52 detects that powder is needed in hopper 62, the system checks the level sensor in the recovery hopper 62. If the level sensor in recovery hopper 62 indicates that there is powder in the hopper 62, then powder is transferred from recovery hopper 62 to feed hopper 52. If, however, the level sensor in recovery hopper 62 indicates that there is no powder in the hopper 62, then virgin powder is transferred into recovery hopper 62 as described above and this powder is then transferred through tube 48 into the feed hopper 52 to satisfy the requirements of feed hopper 52.

Although not shown, in some configurations with one or more cyclones near each end of a spray booth, it may be desirable to have one or both of the cyclones, or pairs or sets of cyclones, to be mounted in a tilted configuration with respect to the vertical. This may be desirable to raise the cyclone exhaust end, and subsequent reclaim powder hopper height, to facilitate gravity transfer of reclaimed powder over longer horizontal distances back to two or more feed hoppers positioned near opposite side walls of a spray booth, for example.

A novel powder feed system 50 is also disclosed by the present invention. See FIG. 4. Of course, each cyclone 30, pair 32, or other plural set of cyclones (not shown) can each feed a separate feed system 50, preferably through tubes 48. In any configuration, each powder feed hopper 52 disclosed is preferably a roll-in fluidizing bed hopper and can be located near a side wall 12 of spray booth system 10. The fluidizing bed powder coating material feed hopper 52 is of the type having a hopper body 54, a plenum section 56 connected with a source of pressurized gas (not shown), and a fluidizing plate (not shown) separating the plenum 56 and the hopper body 54. The hopper body 54 is releasably connected to the plenum 56 and the fluidizing plate as by latches 53 for servicing. The fluidizing plate can be made of any porous member to perform its function of evenly distributing, or diffusing, the fluidizing air flow through the bed of powder, but is preferably of one piece construction. Sintered metals or plastics, such as sintered polyethylene are known to be sufficient for this purpose.

Figure 9:
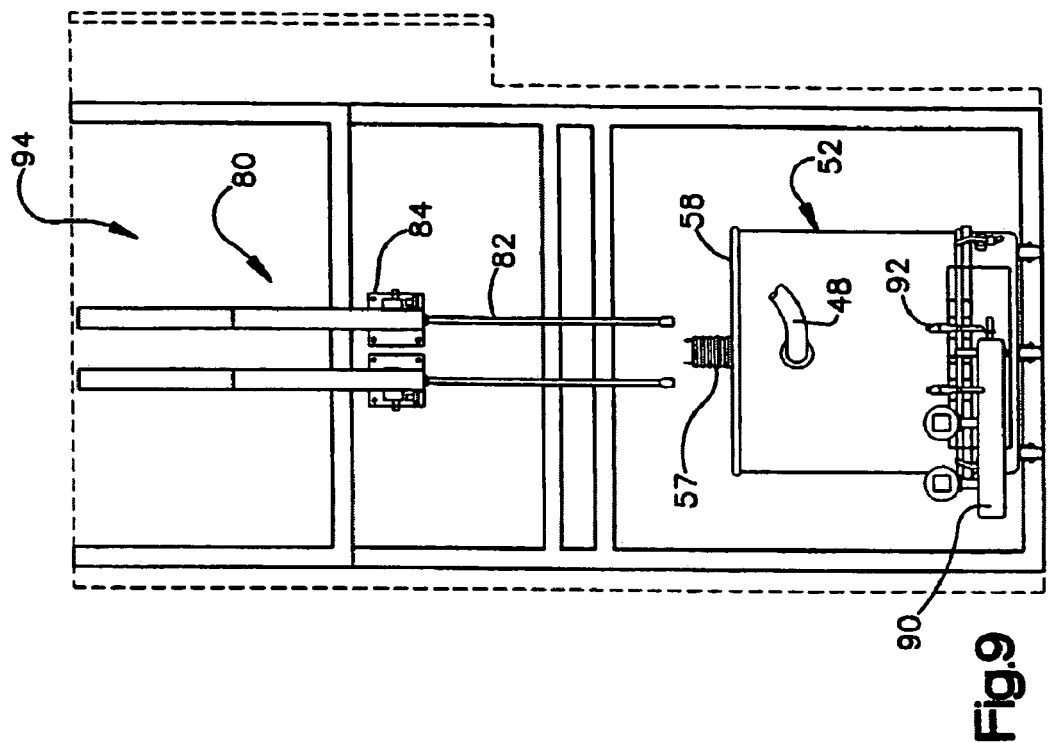
FIG. 9 is an enlarged detailed view of the powder feed system of FIG. 1, similar to FIG. 4 but additionally showing the plenum 96 and powder feed center damper 98 of the present invention.
Figure 8:
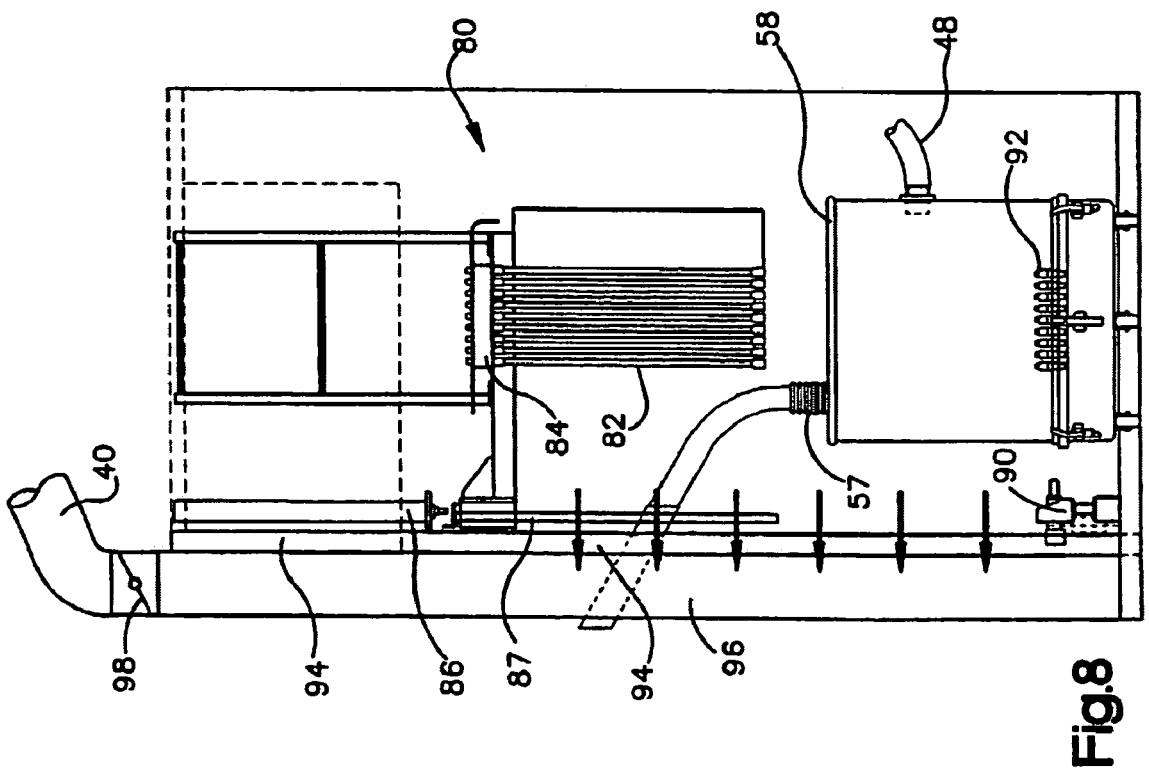
FIG. 8 is an enlarged detailed view of the powder feed system of FIG. 1.

Referring now to FIGS. 8 and 9, an inventive lance assembly 80 is disclosed in the present invention as part of the powder feed center 50. The lance assembly 80 comprises one or more each of powder coating suction tubes 82, powder pumps 84 and powder supply conduits, such as hoses, 128, connecting the powder feed center 50 to the one or more application spray devices 15 (shown as guns 108 in an embodiment illustrated in FIG. 10) (FIG. 3). In a preferred embodiment, the lance assembly 80 includes a plurality of suction tubes 82 and pumps 84, one each for a corresponding powder supply conduit 86 and an application spray device 15.

Since the roll-in fluidizing bed feed hopper 52 is used, the suction tubes can be placed fully into the feed hopper 52, near the fluidizing plate (not shown). As such, the lance assembly 80 is simply movable from a first lower position (not shown), proximate the fluidizing plate within the feed hopper 52, to a second higher position (FIGS. 1, 4 and 8) out of the fluidizing bed hopper 52 for color changes and maintenance. The lance assembly 80 can be actuated to move, such as by a pneumatic actuator 86 and can slide down one or more guide rods 87. Sensing controls are simplified to requiring a simple level sensor device (not shown) versus the multiple sensors required to provide the required feedback for proper material dispensing with feed systems using vibratory powder boxes as feed hoppers and localized fluidizing tubes proximate the powder suction tubes.

In addition to the simplified controls, by adding a containment lid 58 to the fluidizing powder feed hopper 52, and venting the hopper directly to the spray booth 10 via a duct 57, the fluidized gravity feed and bulk unloading via the powder transfer conduit 48 can take place. The containment lid 58 can take the form either of a multiple piece assembly wherein the lid is secured about the installed lance assembly 80, or of a preferred one-piece configuration wherein the lowered lance assembly 80 effectively seals with the containment lid 58 upon seating in the first lower position of the lance assembly 80. The vent duct 57 can be made integral to the containment lid 58, and quickly connectable to communicate with the interior of the booth 10.

Furthermore, a movable purge manifold 90, connectable to a source of pressurized purge gas (not shown), is disclosed in the present invention. The purge manifold 90 has a first stowed position, substantially vertical to minimize its footprint, and a second purge position, substantially horizontal. A preferred form is to have the purge manifold 90 swingable from its stowed to its purge positions. The manifold 90 has one or more purge nozzles, or ports, 92 each of which is designed to engage with a corresponding open end of suction tubes 82 when lance assembly 80 is lowered into its first position for a purge operation and hopper 52 is rolled away. The first position of the lance assembly 80 corresponds to both the feed position in the powder feed hopper 52 and the purge position to engage with the manifold 90.

Alternatively, and more preferably for shorter coating operations, a simple vibratory table and powder feed box, or hopper can be installed in the present system (not shown).

To facilitate cleaning of the external lance assembly 80 and other powder feed system 50 surfaces during a color change operation, such as by blowing off with an air wand, by brushing, etc., a porous wall section 94, preferably a perforated screen member, communicating with a plenum area 96 and the cyclone ducting 40 through a damper 98 is disclosed proximate the position of feed center 50. In addition, side walls 97 (FIG. 3) and a ceiling member (not shown) can be added around feed center 50 to make an enclosure area around the feed center 50 to contain powder during cleaning for collection by the cyclone ducting 40. For example, during a color change, with the cyclones 30 running, the normally closed damper 98 can be opened and the external surfaces of the powder feed system 50 can be blown off by an air wand. Any powder loosened during cleaning will be drawn through the porous wall section 94, into the plenum 96 and into the cyclone exhaust ducting 40 and on to the filters 42 (FIG. 3).

To summarize the method of quick color change now available using the disclosed apparatuses, an operator first raises the lance assembly 80 up and out of a first powder source, such as powder feed hopper 52, from a first lance position to a second lance position. The operator then removes the first powder source from a powder source feed location, such as by disconnecting the fluidizing air and vent duct 57 and rolling fluidized feed hopper 52 away. Next, the purge manifold 90 is moved from a first stowed position to a second, purge position, such as by swinging it from the vertical to the horizontal. The lance assembly 80 is then lowered back down such that each of the one or more powder suction tubes 82 have an open powder suction end engaged with a purge nozzle 92 of the purge manifold 90. This is followed by activating a purge pump to purge the lance assembly 80 with a purge gas. Of course, with the application devices 15 on, they are effectively purged along with their corresponding powder feed conduits, as well. The operator then raises the lance assembly 80 to the second lance position and swings the purge manifold 90 back to the stowed position (such as vertical). A second feed hopper 52 with a new color is rolled into place and connected to the fluidizing air source and the vent duct 57. Lastly, the lance assembly 80 is lowered back into the feed hopper 52, effectively sealing it with the containment lid 58.

The pumps 84 described above, can be of the venturi type, as further detailed below.

Figure 10:
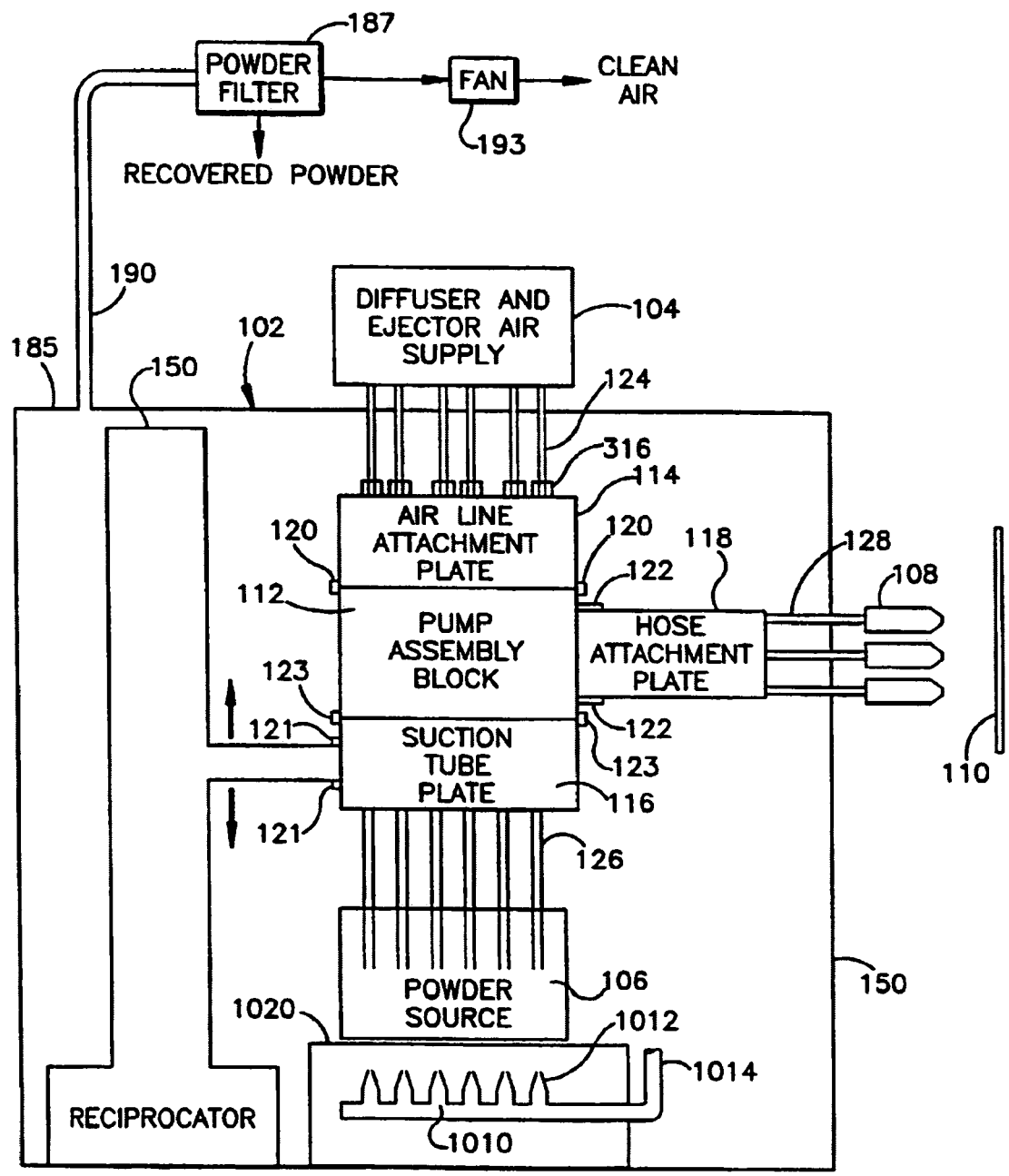
FIG. 10 is a block diagram illustrating the powder supply system of the present invention.

Referring to FIG. 10, a block diagram illustrating a powder coating system 100 of the present invention is shown. Specifically, the system 100 has a powder feed center 102, a diffuser and ejector regulated air supply 104, and one or more spray devices 108 that apply powder to a product 110. The powder feed center 102 has a plurality of components including, a powder source 106, a pump assembly block 112, air line attachment plate 114, suction tube plate 116, hose manifold plate 118, and attachment devices 120, 122, and 123. The attachment devices 120, 122, and 123 releasably attach and detach air line attachment plate 114, hose manifold plate 118, and suction tube plate 116, respectively, to and from the pump assembly block 112. Suction tubes 126 deliver powder from the powder source 106 to pump assembly block 112. Powder is transported by the pump assembly block 112 to the spray devices 108 through hoses 128. The diffuser and ejector air supply 104 provides diffuser and ejector air to the powder feed center 102 through a plurality of dedicated (i.e., diffuser and ejector) air lines 124 to each pump. A reciprocator 150 is attached to suction tube plate 116. A housing 185 encloses the feed center components. Housing 185 is connected by a conduit 190 to powder filter device 187 which is connected to fan 193. Filter 187 separates powder drawn out of housing 185 during color change operations (later described) from the transport air.

To operate the system, air from source 104 passes through air line attachment plate 114 into pump assembly block 112. The pumps in block 112 draw powder up tubes 126 from powder source 106, through plate 116, into pump assembly block 112, and pump the powder through hose manifold plate 118 and hoses 128 to spray guns 108.

Figure 11A:
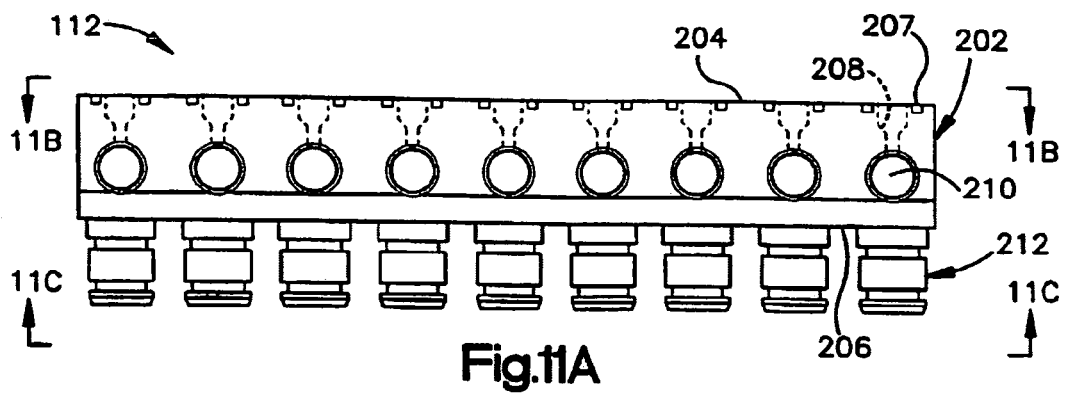
FIG. 11A is a front elevational view of a first embodiment of a pump assembly block of the present invention.
Figure 11B:
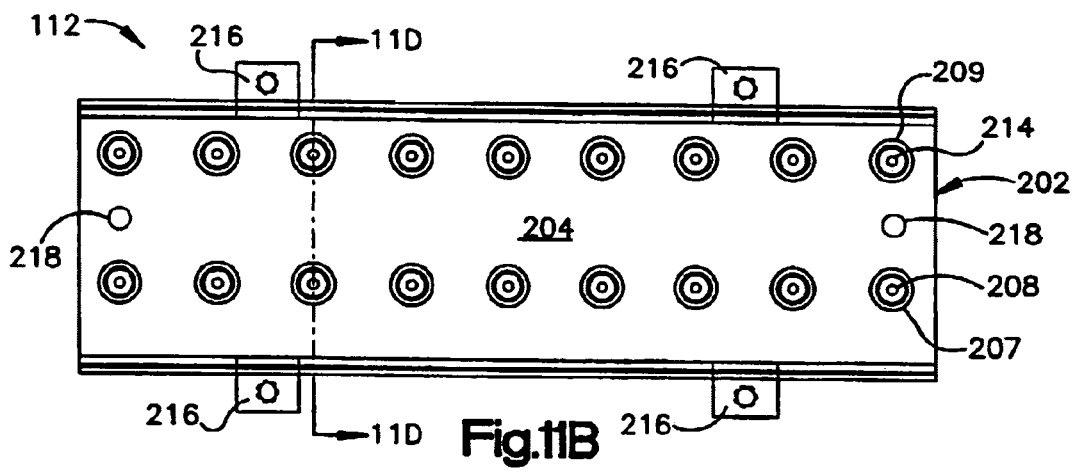
FIG. 11B is top view of the pump assembly block of FIG. 11A taken along line 11B—11B.
Figure 11C:
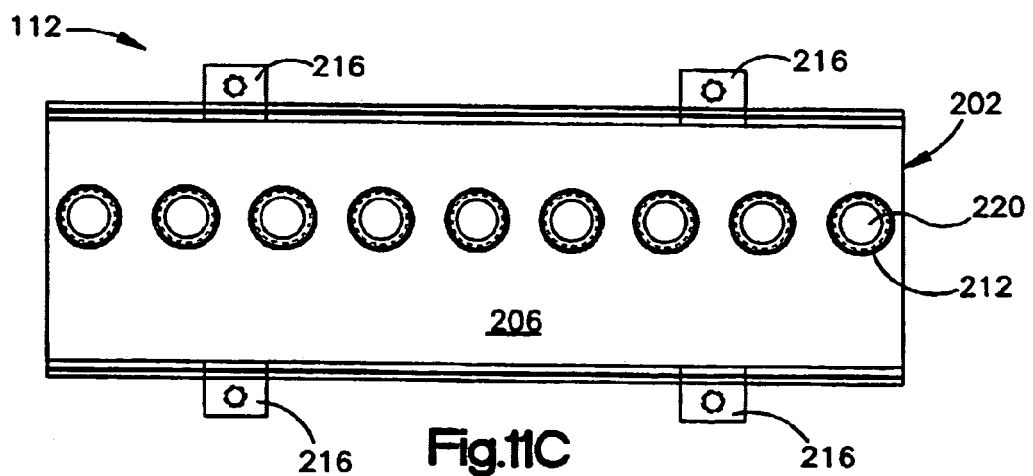
FIG. 11C is bottom view of the pump assembly block of FIG. 11A taken along line 11C—11C.

Referring now to FIGS. 11A–11D, one embodiment of the pump assembly block 112 is shown. Specifically, the pump assembly block 112 has a body 202 that is preferably made of metal. However, other materials may also be used. A plurality of features are formed in the body 202 preferably via machining. In particular, the body 202 has a top surface 204 in which are formed a plurality of diffuser inlet ports such as diffuser inlet port 208 and a plurality of ejector inlet ports such as ejector inlet port 214. The pump assembly block 112 of FIGS. 11A–11C shows a total of nine diffuser inlet ports and nine ejector inlet ports. It should be noted that a greater or lesser number of diffuser and ejector inlet ports may be incorporated into the pump assembly block 112 than the number shown in FIGS. 11A–11C. The ejector inlet ports provide the pump assembly block 112 with ejector air that, by means of ejector air nozzle 700 (see FIGS. 16A–16D) and venturi throat member 800 (see FIGS. 17A–17D), create a venturi effect to suction the powder into the pump chambers and transport it through the pump. The diffuser inlet ports provide the pump assembly block 112 with air that is diffused into the powder to more evenly distribute the powder in the air flow. Around the periphery of each diffuser and ejector inlet port, on top surface 204, are recessed surface portions such as portions 207 and 209 for accepting one or more resilient o-rings that facilitate an air tight connection to the air line attachment plate (shown in FIGS. 12A–12B). Each pump of the pump assembly block 112 has one ejector inlet port and one diffuser inlet port.

The pump assembly block 112 further includes a bottom surface 206 that has a plurality of suction ports such as suction port 212. See FIG. 11D. The pump assembly block 112 shows a total of nine suction ports but it should be understood that a greater or lesser number may be included and that the number shown is merely illustrative of one embodiment. Each suction port 212 has a powder suction inlet 220 through which powder is drawn into each pump chamber 211. Each suction port 212 further includes a plurality of recessed surface portions such as, for example, portions 222 and 224 each of which contain a resilient o-ring (not shown) to facilitate air tight attachment of the suction ports to suction tube plate 116 shown in FIGS. 14A–14B. The pump assembly block 112 further has air line plate attachment members 216 that comprise a plurality of flange portions having tapped or threaded holes therein for accepting fasteners. Each pump chamber 211 is configured to accept an ejector air nozzle shown in FIGS. 16A–16D and a venturi throat member shown in FIGS. 17A–17D (See also FIGS. 18A and 18B).

Referring now to FIGS. 12A–12B, the air line attachment plate 114 of the present invention is shown. The air line attachment plate 114 is preferably made of metal and includes top and bottom surfaces 304 and 314, respectively. A plurality of diffuser and ejector air ports are formed in air line attachment plate 114 such as, for example, ejector port 306 and diffuser port 308. The number of ejector ports and diffuser ports in the air line attachment plate 114 is the same as the number of corresponding ejector inlet ports and diffuser inlet ports that are present in the pump assembly block 112 and their physical positions are coordinated so that they register, or align with each other when plate 114 is attached to block 112. Each diffuser and ejector inlet port includes a threaded portion for accepting a check-valve 316 (see FIG. 18A), or similar device, and a conventional tube or hose attachment for connection to tubes 124 (shown in FIG. 10). Check-valves are provided to ensure that powder or other fluidized material does not travel beyond the air line attachment plate 114 to contaminate the diffuser and ejector air supply system 104 (shown in FIG. 10).

The air line attachment plate 114 further includes a plurality of attachment members 310. Each attachment member 310 is preferably formed as a flanged portion extending from top and bottom surfaces 304 and 314, respectively, and includes a tapped or threaded hole for accepting a fastener. Alternatively, a mechanical latch may be used instead of a threaded fastener. The attachment members 310 are positioned so as to align with attachment members 216 of the pump assembly block 112 when plate 114 is attached to block 112. To further facilitate proper attachment or connection of the air line attachment plate 114 to the pump assembly block 112, guide pins 312 are formed that protrude from bottom surface 314 of the air line attachment plate 114. The guide pins 312 are physically coordinated with corresponding guide holes 218 on the top surface 204 of the pump assembly block 112. See FIG. 11B. Configured as such, the attachment members 216 as well the other attachment members to be described, when used in combination with guide pins and corresponding holes for the various other components, are designed to allow for quick disconnection, disassembly and re-assembly of the pump feed center 102 components. Thus, guide pins such as those indicated by 312 also project from suction tube plate 126 and hose manifold plate 118, to be "keyed" with corresponding guide holes in block 112 for proper alignment of plates 126 and 118 with block 112 during assembly and disassembly of the powder feed center 102. That is, by keying the guide pins in the components 114, 116, 118 with the corresponding guide holes in block 112, one can assure that the powder feed center components will be positioned correctly for assembly. Accordingly, while not expressly shown, guide pins such as this indicated by 312 are preferably employed at every mechanical interface including the interface between the pump assembly block 112 and hose manifold plate 118 and the interface between the pump assembly block 112 and suction tube plate 116.

Figure 13A:
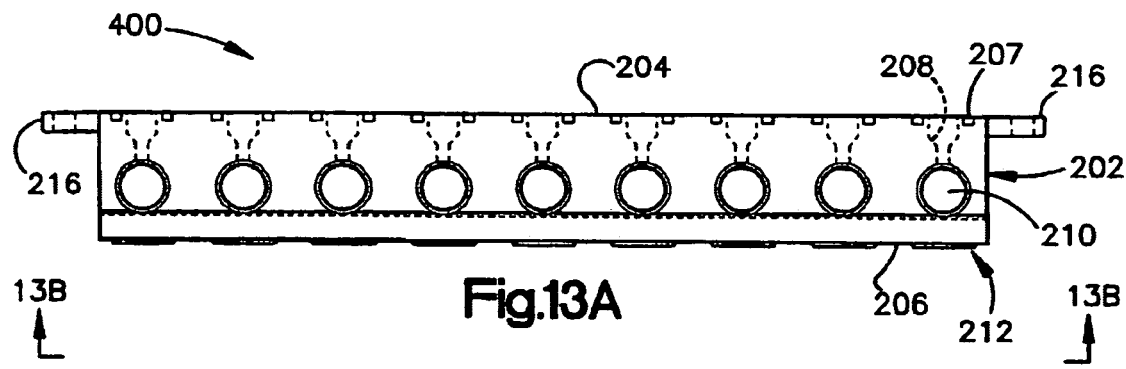
FIG. 13A is a front elevational view of a second embodiment of a pump assembly block of the present invention.
Figure 13B:
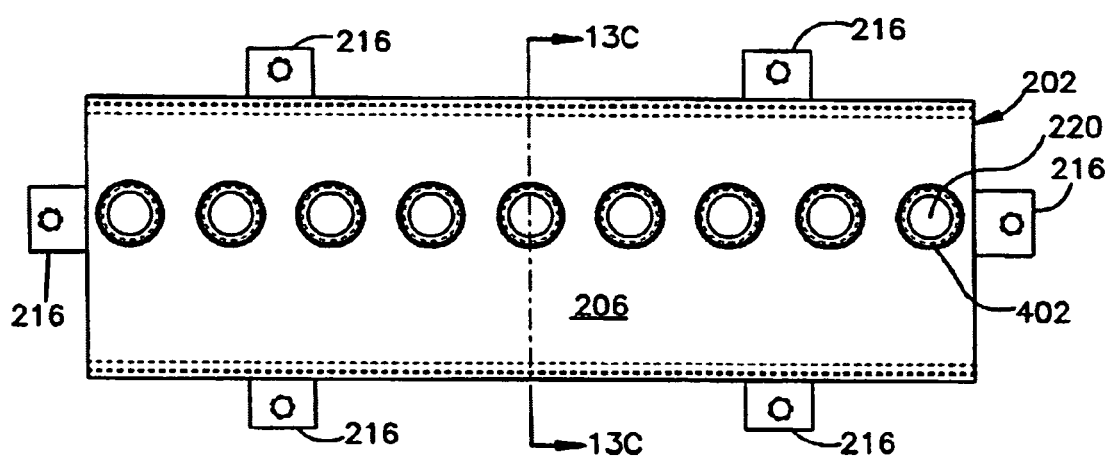
FIG. 13B is bottom view of the pump assembly block of FIG. 13A taken along line 13B—13B.
Figure 13C:
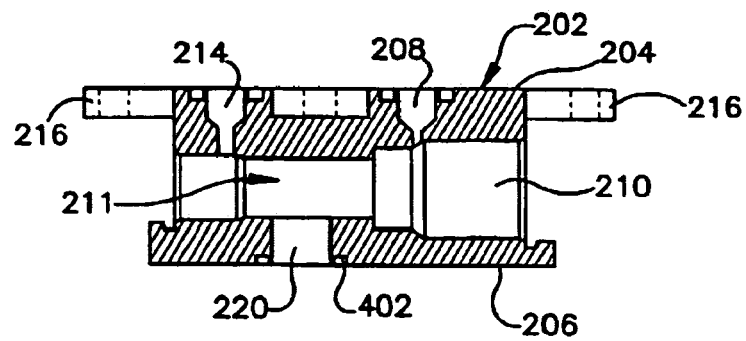
FIG. 13C is sectional view of the pump assembly block of FIG. 13A taken along line 13C—13C.

Referring now to FIGS. 13A–13C, a second embodiment 400 of a pump block assembly 112 is shown. The second embodiment 400 is similar to the embodiment of FIGS. 11A–11D except for a few notable differences. Accordingly, elements common between the two embodiments may be referred to by same reference numbers. In the embodiment of FIGS. 13A–13C, the suction ports 212 are flush or very nearly flush with bottom surface 206. Additionally, around the periphery of each suction port 212, bottom surface 206 includes a recessed portion 402 for accepting a resilient o-ring 470 that facilitates air tight connection of the pump assembly block 400 (of FIG. 13A) with the alternate suction tube plate 116A shown in FIG. 18A. Moreover, an increased number of attachment members 216 for attaching the air line attachment plate 114 to pump block 400 are also shown. The top view of the pump assembly block of FIGS. 13A–13C is the same as FIG. 11B, except for the additional number of attachment members 216.

Figure 14A:
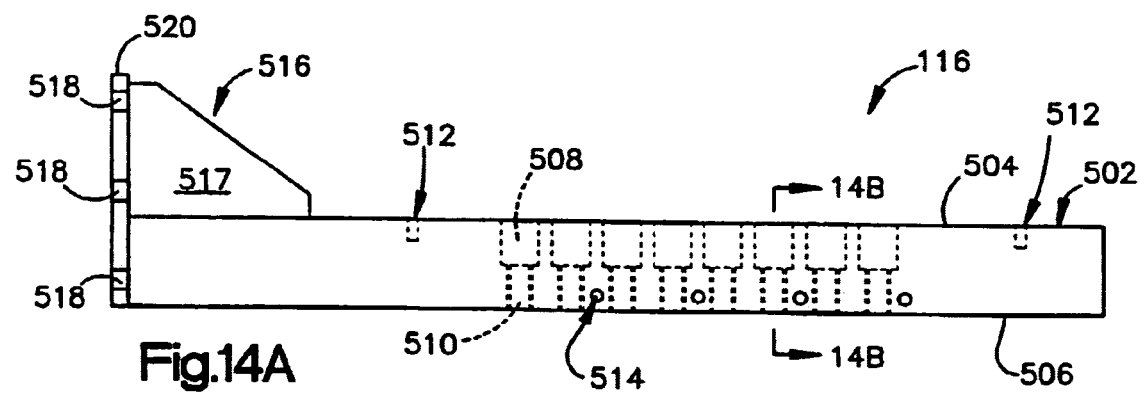
FIG. 14A is side elevational view of a suction tube plate of the present invention.
Figure 14B:
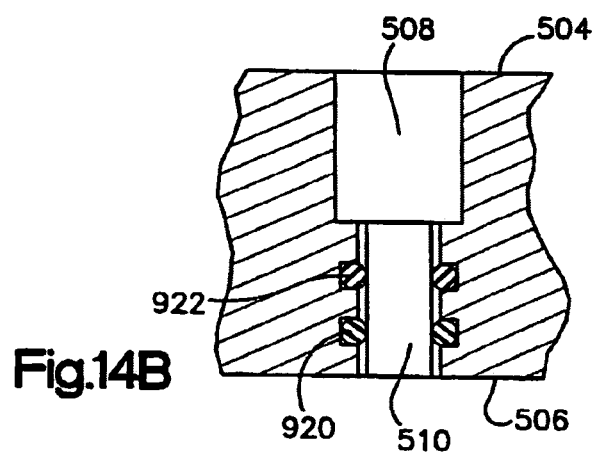
FIG. 14B is a sectional view of the suction tube plate of FIG. 14A taken along line 14B—14B.

Illustrated in FIGS. 14A–14B is one embodiment of a suction tube plate 116 of the present invention. In particular, the suction tube plate 116 has a body 502 having top and bottom surfaces 504 and 506, respectively, and is preferably made of metal. Through the body 502, a plurality of cavities such as those indicated at 508 and 510 are provided. Additionally, apertures 512 are provided in top surface 504 and are configured to accept fasteners or, alternatively, guide pins from the pump assembly block 112. The suction tube plate 116 of FIGS. 14A–14B is configured for attachment to a pump assembly block similar to that shown in FIGS. 11A–11D. Specifically, cavities 508 are configured to accept suction ports 212 (shown in FIG. 11A) and cavities 510 are configured to accept suction tubes 126 shown in FIG. 10.

The body 502 of suction tube plate 116 also includes a mounting feature 516 for mounting or fastening the suction tube plate 116 to a reciprocator 150 (see FIG. 10) for raising and lowering the powder feed center assembly comprised of tubes 126, plate 116, block 112, plate 114 and plate 118 relative to the powder supply container 106. The mounting feature 516 includes a support flange 517 and support plate 520. The support plate 520 includes a plurality of apertures 518 configured to accept fasteners for fastening the suction tube plate 116 to reciprocator 150. Upward movement of reciprocator 150 lifts the suction tubes out of powder source 106 during color change operations. Downward movement of reciprocator 150 drops the bottom ends of tubes 126 into the bed of powder in source 106 during coating operations. Members 121 (in FIG. 10) releasably attach plate 116 to reciprocator 150.

Figure 15A:
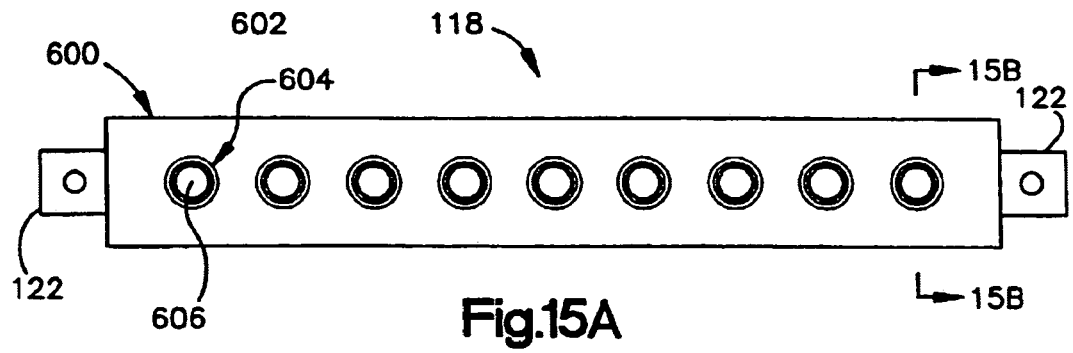
FIG. 15A is a front elevational view of a hose manifold plate of the present invention.
Figure 15B:
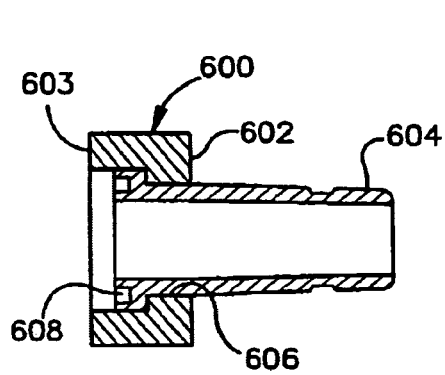
FIG. 15B is a sectional view of the hose manifold plate of FIG. 15A taken along line 15B–15B.

Referring now to FIGS. 15A–15B, one embodiment of a hose manifold plate 118 of the present invention is shown. The hose manifold plate 118 has body 602 that is preferably made of metal. In the alternative, other materials may also be used. The body 602 includes front and rear surfaces 602 and 603, respectively, and hose manifold plate attachment members 122 (two are shown). The hose manifold plate attachment members 122 each include a flange portion having a hole or cavity for accepting a fastener device such as, for example, a screw or threaded bolt. Alternatively, mechanical latches may be employed. The hose manifold plate attachment members 122 removably attach the hose manifold plate 118 to pump assembly block 112 via corresponding tabs (for example) in block 112.

Figure 15C:
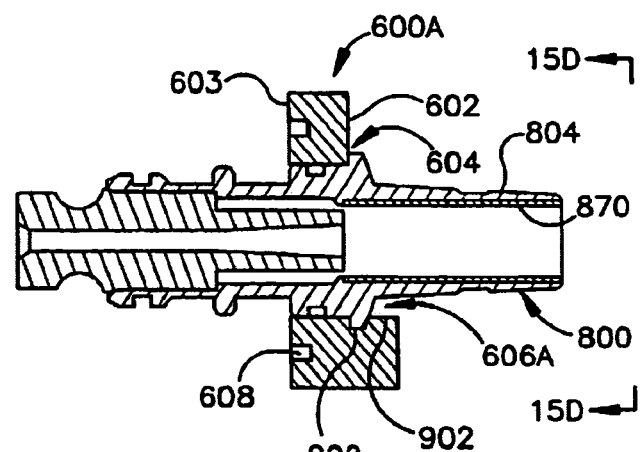
FIG. 15C is a sectional view of another embodiment of a hose manifold plate of the present invention.

The body 602 also includes a plurality of bore holes or cavities (e.g., 606) that extend from the front surface 602 through to rear surface 603. As shown in FIG. 15B, hose attachment members 604 are inserted into the stepped openings 606 of hose attachment plate 600. This embodiment is described later on in more detail. Alternatively, as shown in FIG. 15C, venturi throat holders 800 are received within each of these boars 606A of alternative hose attachment plate 600A. This structure is also later described in more detail.

Consistent with the present embodiment of the powder feed center, nine bore holes are shown in the hose manifold plate of FIGS. 15A and 15B or 15A and 15C for the nine pumps in block 112. The bore holes or cavities are generally cylindrical in nature and may include slightly tapered surfaces.

Figure 15D:
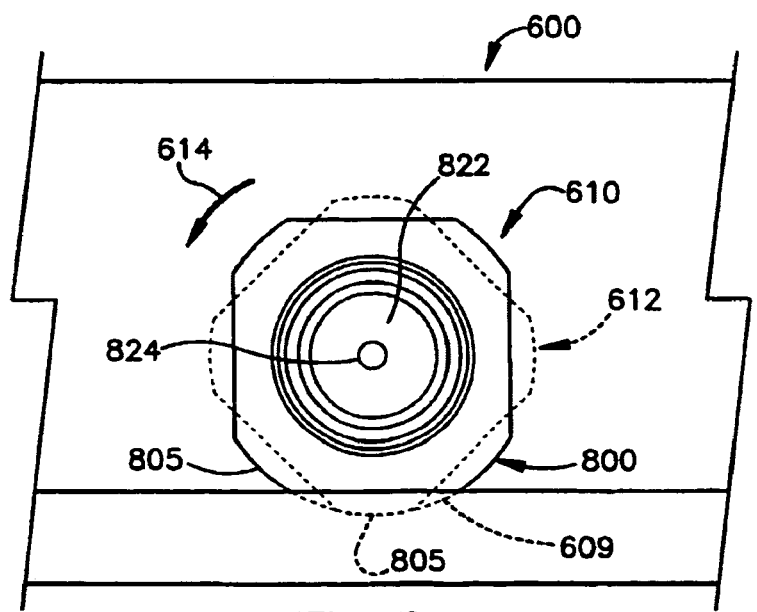
FIG. 15D is a partial front elevational view of a hose manifold plate and venturi throat holder of the present invention illustrated in locked and unlocked positions.
Figure 16A:
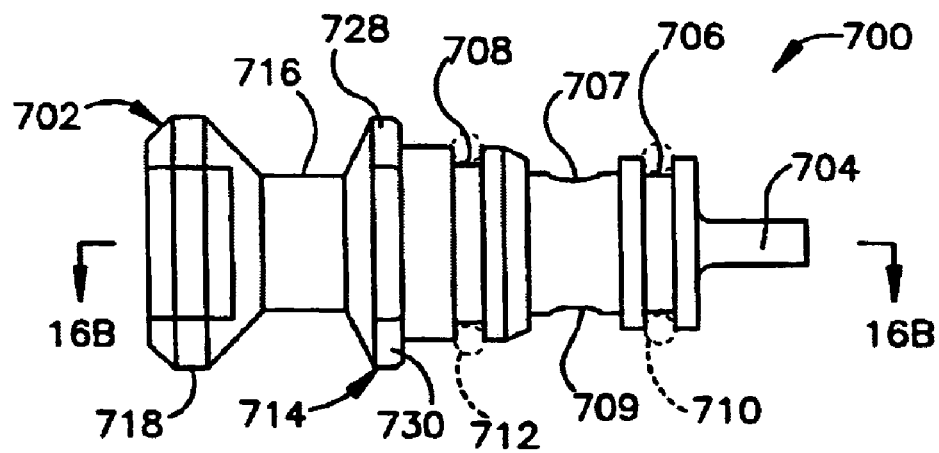
FIG. 16A is a side elevational view of an ejector air nozzle device of the present invention.
Figure 16B:
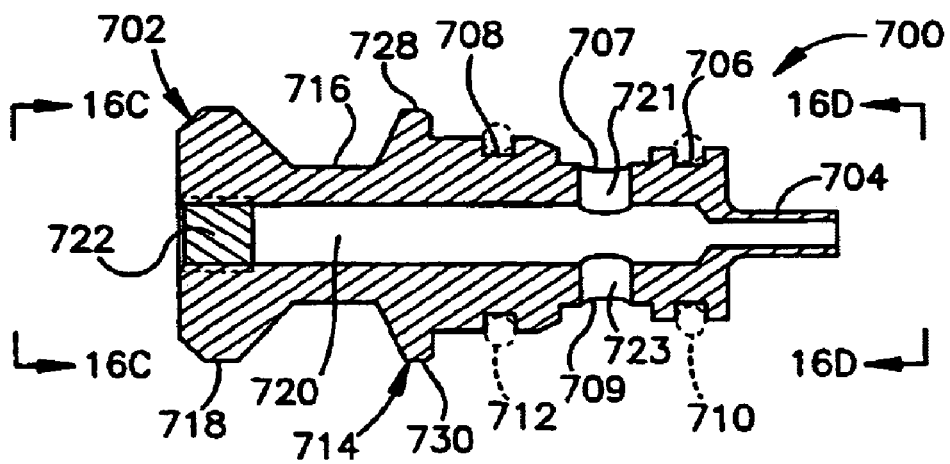
FIG. 16B is a sectional view of the ejector air nozzle device of FIG. 16A taken along line 16B—16B.
Figure 16C:
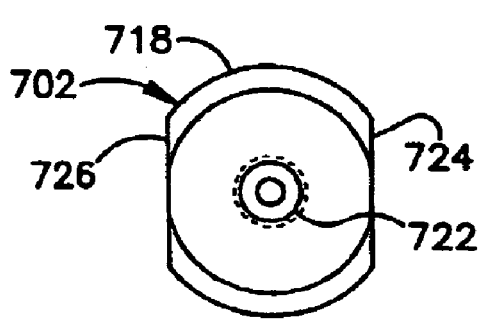
FIG. 16C is a front elevational view of the ejector air nozzle device taken along line 16C—16C.
Figure 16D:
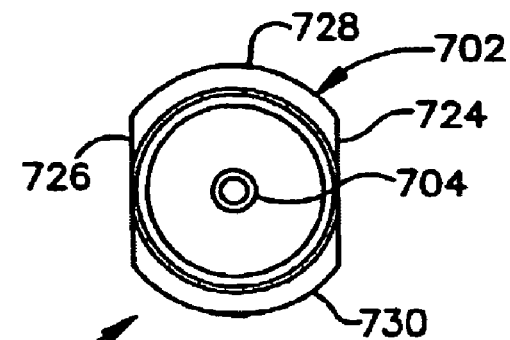
FIG. 16D is a rear elevational view of the ejector air nozzle device taken along line 16D—16D.

Referring now to FIG. 15D, a partial front elevational view of the hose manifold plate 600 and venturi throat holder 800 of the present invention are illustrated in locked and unlocked positions 610 and 612 respectively. More specifically, hose manifold block 600 has a lock groove 609 formed therein for accepting shoulder locking portion 805 of the venturi throat holder 800. To lock the venturi throat holder 800 into the hose manifold plate 600, the venturi throat holder 800 is inserted into the hose manifold plate 600 in position 610. Once inserted, the venturi throat holder 800 is rotated either counter-clockwise, as indicated by arrow 614, or clockwise, so that lock portion 805 enters locking groove 609. The venturi throat holder device 800 is released in a similar manner. Additionally, the locking groove 609 may be formed so as to restrict the direction of locking and unlocking to specific directions such as, for example, counter-clockwise for locking and clockwise for unlocking.

Illustrated in FIGS. 16A–16D is an embodiment of an ejector air nozzle 700 of the present invention. The ejector air nozzle 700 is removably inserted into each pump chamber 211 of the pump assembly block 112. (See FIGS. 18A and 18B). The ejector air nozzle 700 includes a body 702 that is preferably made of metal. The body 702 includes a nozzle portion 704, recessed surface portions 706 and 708 for o-rings 710 and 712, an shoulder portion 714, neck portion 716, and handle portion 718. Between the recessed surface portions 706 and 708, a plurality of inlets 707 and 709 for allowing ejector air to enter the ejector air nozzle are provided. The preferred embodiment includes two such inlets (i.e., 707 and 709) while other embodiments may include a greater or few number as desired.

Inlets 707 and 709 are preferably cylindrical in shape and form inlet cavities or bores 721 and 723. A chamber 720 fluidly communicates inlet cavities 721 and 723 with the nozzle portion 704. As will later be discussed in more detail, ejector air enters through inlet cavities 721 and 723 at an angle of approximately 90 degrees relative the chamber 720 and is then directed through chamber 720 and exits through nozzle portion 704. Chamber 720 includes a threaded portion 722 which is used for inserting a threaded plug-type device for sealing the portion of the chamber 720 distal the nozzle portion 704. However, it should be noted that threaded portion 722 may be connected to an additional, or alternative, ejector air source or air line. In such a configuration, inlet cavities 721 and 723 may or may not be eliminated.

The shoulder portion 714 performs a number of functions. In particular, shoulder portion 714 restricts the insertion depth of the ejector air nozzle 700 into the pump assembly block pump chamber 211 (see FIGS. 18A and 18B). Additionally, by restricting the insertion depth, shoulder portion 714 controls the spacing between the ejector air nozzle portion 704 and the venturi throat member 800 (see FIGS. 17A–17D and 18). Shoulder portion 714 further has locking portions 728 and 730 that are used for interlocking the ejector air nozzle 700 with the pump assembly block 112 to prevent the nozzle from blowing out of the pump assembly block (see FIG. 18C). The handle portion 718 is circular in part, but includes planer surfaces 724 and 726. Planer surfaces 724 and 726 are preferably parallel to each other and facilitate gripping, handling and rotating of the ejector air nozzle 700 during insertion to and removal of nozzle 700 from the pump assembly block pump chamber 211.

Referring now to FIGS. 17A–17D, an embodiment of a venturi throat holder device 800 of the present is shown. The venturi throat device 800 is configured to be removably inserted opposite the ejector air nozzle 700 into each pump chamber 211 of the pump assembly block 112. (See FIGS. 18A and 18B). Each pump chamber 211 is configured to accept a venturi throat device 800. The venturi device 800 has a body 802 that is preferably made of metal. However, other materials be substituted therefore. The body 802 includes a number of features including a hose attachment portion 804 for attaching hoses 128 between the powder feed center 102 and the spray devices 108. In the alternative, hose attachment portion 804 may be eliminated in the case where the hose manifold block 118 includes a hose attachment portion such as shown in FIG. 15B.

Body 802 further includes a shoulder portion 803 configured to control the insertion depth of the venturi throat device 800 in the pump assembly block 112. By controlling the insertion depth, shoulder portion 803 controls the spacing between the ejector air nozzle portion 704 and the venturi throat member 800. Additionally, shoulder portion 803 is similarly configured with locking portions such as portion 805 that are used for interlocking the venturi throat device 800 with the pump assembly block 112 to prevent the venturi throat device from blowing out of the pump assembly block (see FIG. 15D).

Figure 17A:
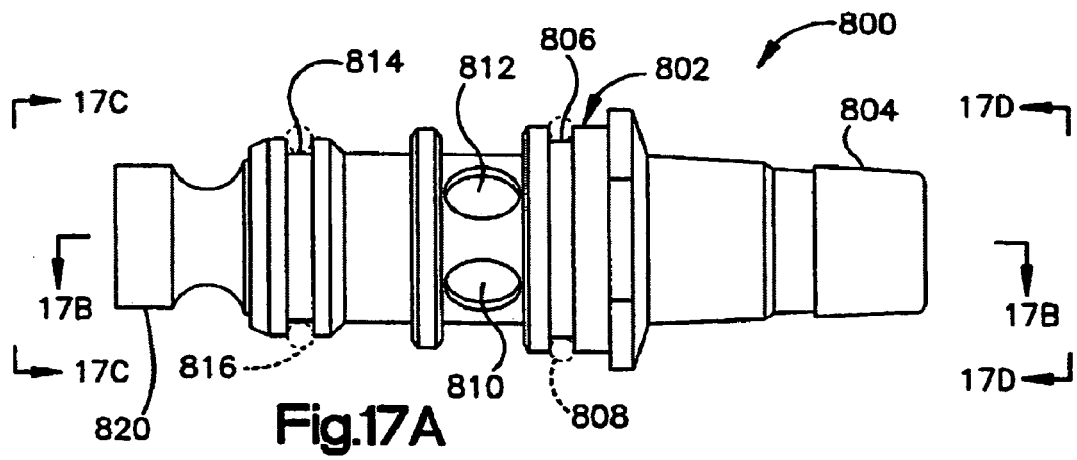
FIG. 17A is a side elevational view of a venturi throat holder device of the present invention.
Figure 17B:
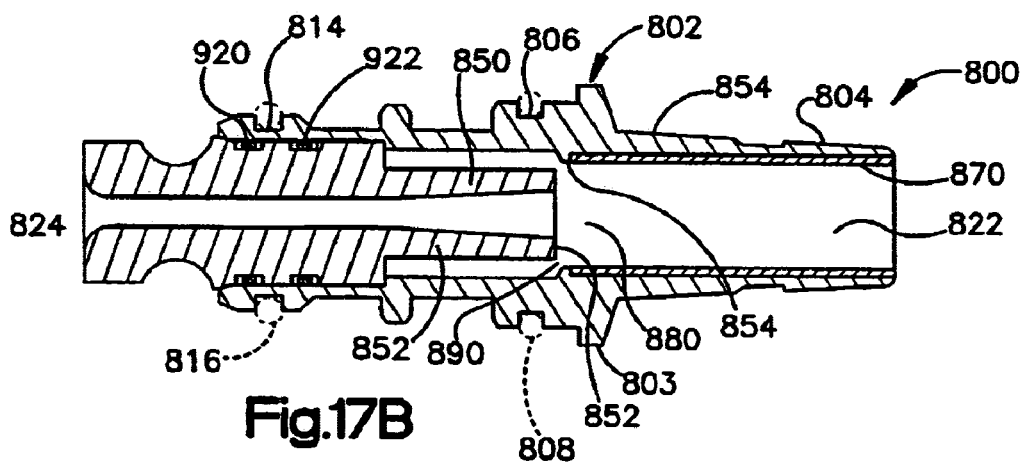
FIG. 17B is a sectional view of the venturi throat holder device of FIG. 17A taken along line 17B–17B.
Figure 17C:
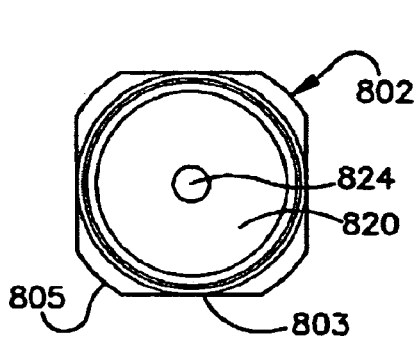
FIG. 17C is a front elevational view of the venturi throat holder device taken along line 17C—17C.
Figure 17D:
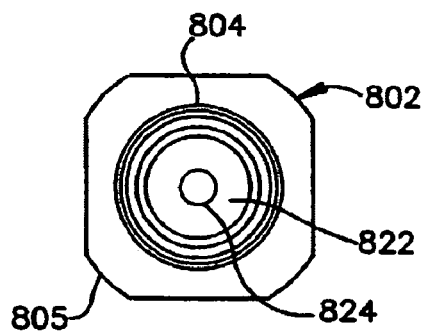
FIG. 17D is a rear elevational view of the venturi throat holder device taken along line 17D—17D.

Body 802 further includes one or more diffuser air inlet ports 810 and 812 that provide diffuser air into an internal chamber 822. With reference to FIGS. 17A and 17B, air enters the chamber 822 through openings 810 and 812 and passes between the wall of the chamber 822 and the outer surface of the outlet portion 850 of venturi member 820. The air then passes through an annular gap between the end 852 of venturi member 820 and an internal shoulder 854 which projects into the passage 822 of venturi holder 800. An internal wear sleeve 870 is inserted into the end of venturi holder 800 and makes contact with internal shoulder 854. Venturi 820 has a chamber 824 which is in fluid communication with chamber 822. The venturi portion 820 is preferably made of a machined or molded plastic material. In other embodiments, the venturi portion 820 may be made of metal. The body 802 includes recessed surface portions 806 and 814 that are configured to accept resilient o-rings 808 and 816. The recessed portions 806 and 814 and the resilient o-rings 808 and 816 facilitate frictional attachment and release of the venturi throat device 800 in each pump chamber 211.

Figure 18A:
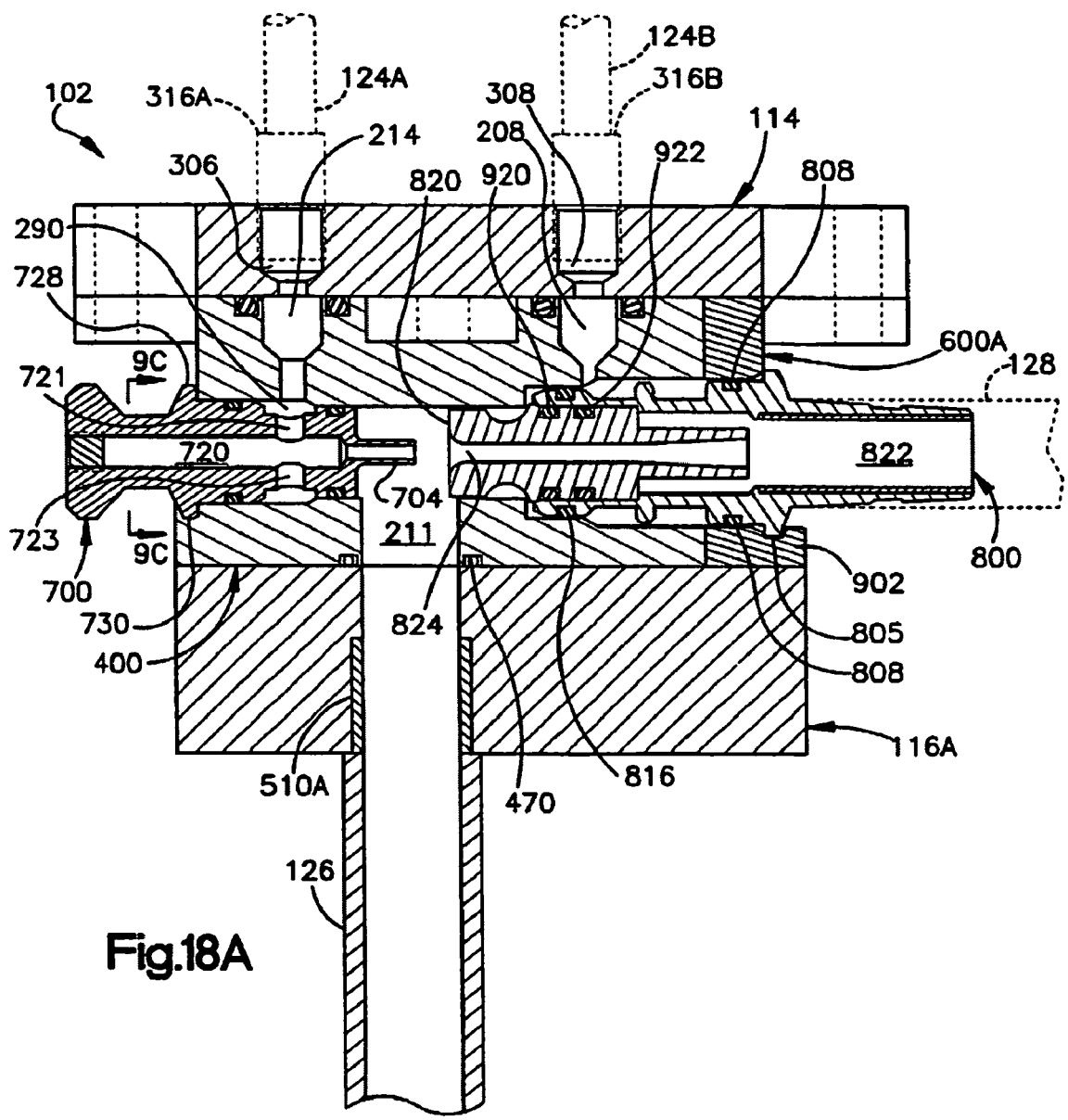
FIGS. 18A and 18B are cross-sectional views of two embodiments of a fully assembled powder feed center of the present invention.
Figure 18B:
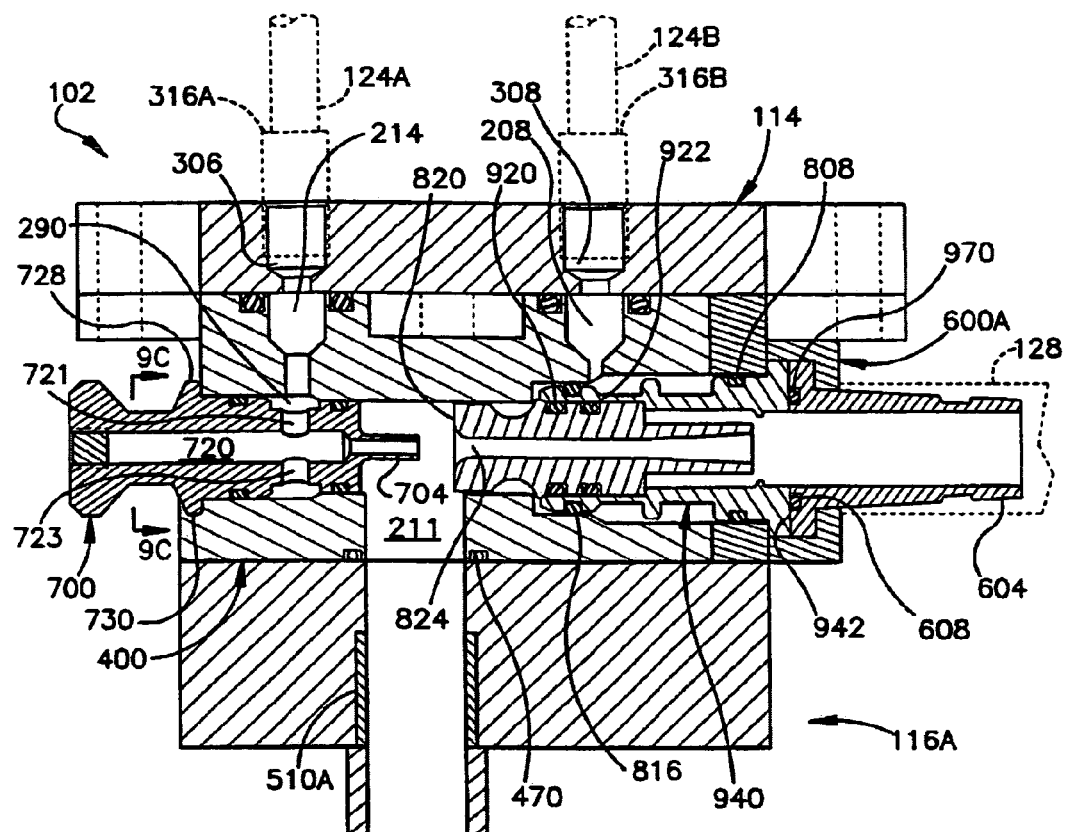

So configured (as shown in FIGS. 18A and 18B), ejector air entering the ejector air nozzle 700 and discharged from nozzle 704 into venturi member 820 creates suction that draws fluidized powder up suction tubes 126 and into the venturi throat chambers 824. From chambers 824, the fluidized powder travels to chamber 822 where it encounters diffuser air introduced through gap 880. Thereafter, the fluidized powder exits the venturi throat devices 800 through hoses 128 that are connected to the spray device 108.

FIG. 18A is a cross-sectional view of an assembled powder feed center 102 of the present invention employing the pump assembly block 400 of FIGS. 13A–13C, hose manifold plate 600A of FIG. 15C, air line attachment plate 114, and the alternative suction 116A. Additionally, ejector air nozzle 700 and venturi throat holder device 800 are shown inserted into the pump assembly block 400. So configured, the air line attachment plate 114 forms an air line path device from the diffuser and ejector air supply 104 to the pump assembly block 112. The suction tube plate 116A provides a suction path device from the powder source 105 to the pump assembly block 400. The hose manifold block 600A provides a spray path device from the pump assembly block 400 to the spray device(s) 108.

Figure 18C:
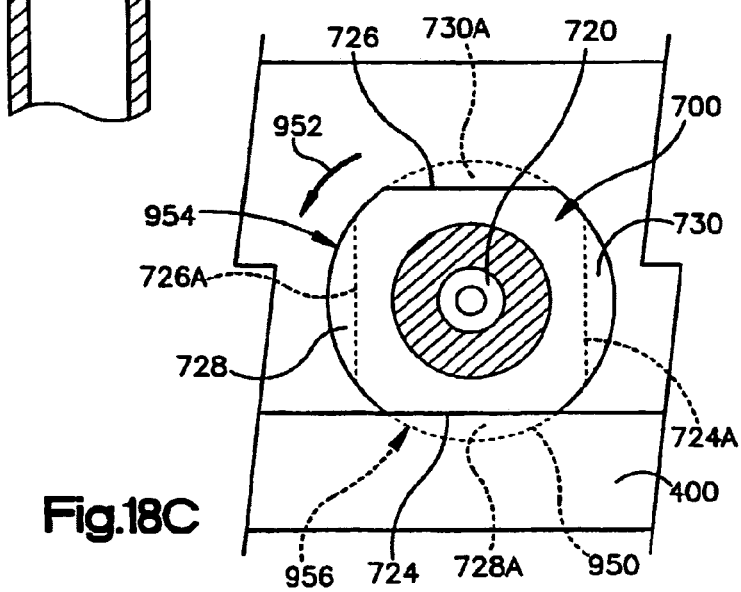
FIG. 18C is a partial front elevational view of a pump assembly block and ejector nozzle of the present invention illustrating the nozzle in the locked and unlocked positions.

With further reference to FIG. 18A in more detail, and also to FIG. 10, an ejector nozzle 700 is inserted into each of the pump cavities in pump block 400. FIG. 18C shows how the locking portions 728 and 730 are used to lock each ejector nozzle 700 into pump block 400 by means of a flange 900 on block 400. O-rings 710 and 712 provide frictional engagement between the nozzles 700 and the block 400 and also provide an airtight seal therebetween.

To complete the pump assembly block, venturi throat holders 800 are first inserted into openings in hose attachment plate 600A. Locking members 803 are engaged with flange 902 to lock the members 800. An o-ring 808 is used to frictionally secure the venturi members 800 to the plate 118 and to provide an airtight seal therebetween. The venturi members 820 are inserted into the ends of the venturi throat holders 800 and are frictionally retained by o-rings 920 and 922 which form an air-tight seal therebetween. This assembly, comprised of the throat holders 800, venturi throats 820 and hose manifold plate 600A is now installed as a unit onto the pump block 400. As the assembly 600A, 800, 820 is installed, each of the venturi members 800 is inserted into one of the pump cavities of the block 400 opposite to an ejector nozzle 700 already installed into the opposite end of the pump cavity as described above. O-rings 816 frictionally secure the venturi holders 800 to the wall of the pump cavities and provide an air tight seal therebetween. Alignment pins can be provided on the hose plate 600A to be received in corresponding holes in the pump block 400 to ensure proper alignment between plate 600A and block 400.

Air line attachment plate 114 is attached to this completed pump assembly block by means of releasable attachment devices. These attachment devices can be in the form of tabs 310 which are secured to corresponding tabs 216 of pump block 400 by bolts or other releasable attachment means. To ensure that all the air passages 306 and 308 of plate 114 align with the corresponding air passages of block 400, guide pins 312 in the plate 114 are received in holes (not shown) of the block 400.

Suction tube attachment plate 116A is now assembled to block 112. First, however, suction tubes 126 are threaded into the openings 510A in the suction tube plate 116. Then plate 116 is assembled to the block 112 by attachment devices (not shown). The assembly is preferably accomplished via an o-ring fit wherein o-rings reside in recessed surface portions 222 and 224 of block 112. In the case of alternative pump assembly block 400, conventional flanges and fasteners (not shown) preferably attach suction tube plate 116A to pump assembly block 400 with o-rings provided for the function of sealing the mechanical interfaces. (See FIG. 18A). As the plate 116 is attached to block 112 alignment pins and corresponding holes can be used to insure the proper registering of the passages 510A in the plate 116A with those in the block 400.

FIG. 18B shows an alternate embodiment. In FIG. 18B venturi throat holder 940 is cut short so that a face 942 is provided on the right end of the holder 940. The holder 940 includes o-rings 808, 816 which frictionally secure the venturi holder 940 in the pump cavity. Hose plate 600 includes a hose attachment member 604 received in each of the openings 606 of the plate 600. An o-ring 970 is provided in recessed surface portion 608 to provide an airtight seal between the hose attachment member 600 and the face 942 of the venturi holder 940 when the plate 600 is attached to pump block 400 by means of tabs 122 attached to corresponding tabs (now shown) on the pump block 112. Locking pins and corresponding holes may be used between the plate 600 and the block 400 to ensure proper alignment between the hose attachment members 604 and the venturi throat holders 940. A hose 28 is attached to each of the hose attachment numbers 604 to supply powder to the spray guns.

FIG. 18C is a partial front elevational view of the pump assembly block 400 and ejector nozzle 700 of the present invention illustrating the nozzle 700 in the locked and unlocked positions 954 and 956, respectively. More specifically, pump assembly block 400 has a lock groove 950 formed therein for accepting either locking portion 728 or 730 of the ejector nozzle 700. To lock the ejector nozzle 700 into the pump assembly block 400, the ejector nozzle 700 is inserted into the pump assembly block 400 in position 954. Once inserted, the ejector nozzle 700 is rotated either counter-clockwise, as indicated by arrow 952, or clockwise, so that locking portion 728 enters locking groove 950. The ejector nozzle 700 is released in a similar manner. Additionally, the locking groove 950 may be formed so as to restrict the direction of locking and unlocking to specific directions such as, for example, counter-clockwise for locking and clockwise for unlocking. In FIG. 18C, locking portions 728 and 730 and planar surface portions 724 and 726 of the ejector nozzle 700 are shown in their locked positions via reference numerals 728A, 730A, 724A, and 726A, respectively.

Referring now to FIG. 10, the operational characteristics of the present invention will now be discussed. Powder of a first coating type or color is introduced into the pump assembly block 112 from powder source 106 through the suction tubes 126 and suction tube plate 116. In pump assembly block 112, the powder is pumped via ejector and diffuser air supplied through air line attachment plate 114, ejector and diffuser air lines 124, and diffuser and ejector regulated air supply. The fluidized powder exits the pump assembly block 112 through the hose manifold plate 118 to the spray devices 108 through hoses 128. The spray devices 108 apply the fluidized powder to one or more products 110. As described earlier, the powder is typically color based and used for painting the product 110.

More specifically, with reference to FIG. 18A, compressed air from source 104 in FIG. 10 is provided via air lines 124A and 124B to check valves 316A and 316B into the ejector air opening 306 and diffuser air opening 308 of air line attachment plate 114. From the ejector air opening 306, the air passes into the injector air inlet 214 and into the space 290 between chamber 211 and injector nozzle 700. The air then proceeds through passages 721 and 723 into chamber 720 and out nozzle 704. The air jet issuing from nozzle 704 is directed into chamber 824 in venturi 820. This creates a suction force in chamber 211 which pulls powder from source 106 in FIG. 10 up suction tube 126 through chamber 211 and into venturi member chamber 824. This creates a powder and air mixture which flows through chamber 824 into the chamber 822 where it is impacted by an air flow projected through the gap 890 between the venturi end 852 and internal shoulder 854. The air flow issuing through this gap 890 is provided from the air supply 104 in FIG. 10 through air line 124B and check valve 316B into the diffuser air opening 308 to diffuser inlet port 208 of pump block 400. The air flows from diffuser inlet port 208 through the holes 810 and 812 in venturi holder 800 and then into the space between the outer surface of venturi outlet portion 850 and the wall of chamber 822. This air flow then issues through the gap 890 to inner mix with the powder and air mixture flowing through the chamber 822. The pump then propels this powder and air mixture through the hose 128 for delivery to the spray gun 108 in FIG. 10.

When a change in powder color is required, one of two general procedures for effecting the change are provided by the present invention. According to a first embodiment, electrostatic spraying with the first powder color is discontinued after the last product has been painted. A manual blow-down of the exterior of the powder feed center components is preferably performed with the fan 193 running to draw powder blown off of the components out of housing 185. While not necessary, it is preferable that the hose manifold plate 118 be detached from pump block assembly 112 for a manual blow-down of the exterior of the hose manifold plate 118, hoses 128, and spray devices 108. The hose manifold plate 118 is re-attached to the pump assembly block 112 and, after the powder source 106 is removed, the entire feed center 102 is connected to a purge air system 1010 through suction tubes 126. To accomplish this, the reciprocator 150 indexes down to seal the bottoms of suction tubes 126 onto purge nozzles 1012. Purge air is cycled into suction tubes 126 through air nozzles 1012 which comprise part of an air manifold 1010 supplied by a pressurized air conduit 1014 connected to air supply 104. The purge air passes through suction tube plate 116, pump assembly block 112, hose manifold plate 118, hoses 128, and spray devices 108. The ejector and diffuser air lines 124 are preferably connected to air line attachment plate 114 through a plurality of check-valves 316 to prevent introduction of purge air into the diffuser and ejector air control system 104 during this purge step. Moreover ejector and diffuser air can also be supplied during the purge cycle to further increase the purge effects on the powder feed center 102. The purpose of the purge cycle is to "purge" as much of the remaining powder as possible out of the system. Once the purge cycle is completed, reciprocator 150 moves tubes 126 to the "up" position and any powder on the outside of tubes 126; plate 116 or any of the other feed system components is manually blown off with an air wand while the fan 193 is operating to withdraw any dislodged powder out of housing 185. A new box or source 106 of a second color is now placed in the feed center 102 on gridwork 1020, and reciprocator 150 lowers the tubes 126 into the new box 106. The powder feed center 102 is now ready to resume coating but with powder of a second color. In this manner, the purge cycle is relied upon as the primary vehicle for reducing powder color cross-contamination, and the feed center is not disassembled for cleaning.

A second color change procedure is provided by the present invention that further reduces the effects of color cross-contamination when changing between a first powder color and a second powder color. The initial steps are the same as those described for the first procedure. However, after purge cycle completion, reciprocator 150 moves the tubes 126 to the up position out of engagement with nozzles 1012, and air line attachment plate 114 and hose manifold plate 118 are detached from the pump assembly block 112. Additionally, pump block 112 is detached from suction tube plate 116 which remains attached to reciprocator 150. A second pump assembly block 112 is substituted for the present pump assembly block wherein the second pump assembly block 112 can be a new, previously cleaned, or color dedicated pump assembly block. Additionally, a second hose manifold block 118 can be substituted for the present hose manifold block. In similar fashion, the second hose manifold block 118 can be a new, previously cleaned, or color dedicated hose manifold block. It is preferable that the pump assembly block 112 and hose manifold plate 118 be shifted-out or substituted in pairs. The air line attachment plate 114 and suction tube plate 116 are not changed. Therefore, the new or cleaned pump assembly block 112 is re-attached to the suction tube plate 116. The new or cleaned hose manifold plate 118 is attached to the pump block 112 and the air line attachment plate 114 is attached to the pump block 112. Any residual powder on the exterior of these components is blown-off with an air wand with the fan 193 operating to draw any over-sprayed powder from the housing 185 through the duct 190 to the filtering apparatus 187. One advantage of this second color change procedure is that there is no time-consuming step of disconnecting and reconnecting individual air lines since all air lines remain connected to the air line attachment plate 114. The new box of a second color is now placed in feed center 102 on gridwork 1020 and reciprocator 150 lowers the tubes 126 into the new box 106. Regulated air supply 104 can now be operated to provide compressed air to the clean pump assembly to pump powder from the new box of powder through the pump assembly to the spray guns for spraying onto products.

By allowing for the change or substitution of the pump assembly block 112 and hose manifold block 118, the present invention provides a range of options for reducing or eliminating color cross-contamination during powder color changes. For example, if a new pump assembly block 112 and a new hose manifold plate 118 are substituted for the present pump assembly block 112 and hose manifold plate 118, the amount of color cross-contamination is greatly reduced or even eliminated given the new and uncontaminated components. If a previously cleaned pump assembly block 112 and hose manifold plate 118, which preferably have been cleaned off line while the system is in operation, are substituted for the present pump assembly block and hose manifold plate, the amount of color cross-contamination is also largely reduced, depending on the quality of the previously administered cleaning.

There are situations were some degree of color cross-contamination is tolerable. More specifically, light shades of various powder colors can effectively mask contamination caused by other light shades of powder colors. Similarly, dark shades of powder colors can also effectively mask contamination caused by other dark shades of powder colors. Therefore, a first color dedicated pump assembly block can be used for a range of light shades of powder color and a second color dedicated pump assembly block can be used for a range of dark shades of powder color. With such a configuration, the first pump assembly block would be substituted when a powder color change from a light shade of powder color to a dark shade of powder color is required. On the other hand, a powder color change from a light shade of a first particular powder color to a light shade of second particular powder color would not necessarily require a change in the pump assembly block 112 and hose manifold plate 118. In this manner, the present invention provides various degrees of control over the time required to effect color changes throughout the course of production depending on the color differences between the current color of powder and the next color of powder to be used and the amount of color cross-contamination which can be tolerated.

With reference to FIGS. 19 and 20, a simplified spray coating booth 10 is illustrated, with application devices 15, opposed cyclones 30 each connected to an inlet (not shown), and via a channel 35 as previously described, to an intake 36 in the floor 18 of the booth 10. To facilitate powder collection to cyclone intakes 36, floor sweepers, or scraper bars, such as 2 are known and used. Typically, the booth floor 18 is rectangular and the sweeper 2 substantially spans the width of the floor. These floor sweepers may be magnetically coupled, such as to tracks 4 positioned under floor 18, and reciprocated back and forth across floor 18. Alternatively, the drive tracks may be positioned proximate the floor 18, but behind side walls 12 (this embodiment not shown).

Even with such systems, hundreds of pounds of coating material may have to be cleaned from a spray booth after a coating operation in preparation for a color change operation. Positioning of the cyclones 30 at the ends of the booth 10 creates a low air velocity area near the center of the booth 10. Consequently, more powder coating material falls to the floor. This inventive embodiment places troughs 6 in the floor 18 between the application devices 15 and the cyclone intakes 36. The collection troughs can be from about 4 to 6 inches wide and have a slanted bottom 7 as shown in FIG. 20. Bottom 7 can be fluidized to help to migrate the collected powder to the low end of the trough at the bottom of the slant. The powder material collected can then be transported to a sieve and then returned to the feed hopper.

Referring now to FIG. 21, an inventive spray coating booth explosion door is provided. The explosion door, shown generally at 3 forms one side wall of channel 35. Door 3 has a first upper section 5 hingedly attached (as at hinges 9) to an end wall 16 of the booth. The first section 5 forms a part of channel 35 adjacent the cyclone inlet 34 and is operable to open away from the inlet 34 to vent in the event of a first over-pressure condition within the cyclone 30. The explosion door 3 has a second larger section 8 also hingedly attached to the end wall 16 as at hinges 9 and operable to vent the cyclone 30 and channel 35 in the event of a second over-pressure condition within the channel 35 and/or cyclone 30. Over-pressure conditions within the cyclone 30 may be caused by a deflagration, for example. The explosion doors 3 are a safety measure to facilitate rapid venting of the cyclone in such an emergency. In addition, the doors provide easy access to the channel 35 and inlet 34 for cleaning operations during color changing.

While the present invention has been illustrated by the description of embodiments thereof, and while the embodiments have been described in some detail, it is not the intention of the applicants to restrict or in any way limit the scope of the appended claims to such detail. Additional advantages and modifications will readily appear to those skilled in the art. For example, more or less than nine pump chambers may be included in the pump assembly block 112, more than one ejector air line may be provided to each pump chamber ejector inlet port, and more than one diffuser air line may be provided to each pump chamber diffuser inlet port. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A powder coating spray system comprising:

a spray booth having a floor, a ceiling, and one or more generally vertical walls;

one or more spray devices positioned with respect to the one or more generally vertical walls of the booth to spray powder coating material onto articles passed through the booth;

a powder feed system;

a powder recovery system including a cyclone separator, said cyclone separator connected by a channel to an inlet of said booth to remove airborne over-sprayed powder from said booth; and a door that forms at least a part of said channel, said door forming a part of the interior surface of the booth and being opened to allow access to the inside of the channel for cleaning during color change operations; said cyclone being operational to draw powder through said inlet and said channel when said door is open and when said door is closed.

2. The system of claim 1 wherein said door comprises first and second sections separately hinged to said side wall.

3. The system of claim 2 wherein said first and second sections are vertically arranged one above the other.

4. The system of claim 2 wherein at least one of said first and second sections opens outwardly into said spray booth interior.

5. The system of claim 1 comprising one or more exhaust fans to draw air through said cyclone separator.

6. The system of claim 1 wherein said door is hinged.

7. The system of claim 1 wherein said channel has an inlet connected to said booth inlet and an outlet connected to an inlet to said cyclone separator, so that said cyclone separator removes powder from said spray booth through said booth inlet into said channel through said channel inlet and into said cyclone separator inlet through said channel outlet.

* * * * *